United States Patent
Kim et al.

(10) Patent No.: US 11,924,803 B2
(45) Date of Patent: Mar. 5, 2024

(54) METHOD AND DEVICE FOR PERFORMING POSITIONING IN NEXT GENERATION WIRELESS NETWORK

(71) Applicant: KT CORPORATION, Gyeonggi-do (KR)

(72) Inventors: Ki-tae Kim, Seoul (KR); Woo-jin Choi, Seoul (KR); Ki-Hyeon Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/047,375

(22) PCT Filed: Apr. 8, 2019

(86) PCT No.: PCT/KR2019/004139
§ 371 (c)(1),
(2) Date: Oct. 13, 2020

(87) PCT Pub. No.: WO2019/198994
PCT Pub. Date: Oct. 17, 2019

(65) Prior Publication Data
US 2021/0120522 A1   Apr. 22, 2021

(30) Foreign Application Priority Data

Apr. 13, 2018   (KR) .................. 10-2018-0043367
Apr. 4, 2019   (KR) .................. 10-2019-0039653

(51) Int. Cl.
*H04W 64/00*   (2009.01)
*G01S 5/10*   (2006.01)
(Continued)

(52) U.S. Cl.
CPC ............. *H04W 64/006* (2013.01); *G01S 5/10* (2013.01); *H04L 5/0051* (2013.01);
(Continued)

(58) Field of Classification Search
CPC ........... H04W 64/006; H04W 72/0446; H04W 72/0453; H04W 72/0493; H04W 80/02;
(Continued)

(56) References Cited

U.S. PATENT DOCUMENTS

2011/0117925 A1   5/2011   Sampath et al.
2012/0040696 A1   2/2012   Siomina et al.
(Continued)

FOREIGN PATENT DOCUMENTS

WO   2016/163943 A1   10/2016

OTHER PUBLICATIONS

3GPP, TS 36.133 V15.2.0, Mar. 2018.
(Continued)

*Primary Examiner* — Kabir A Timory
(74) *Attorney, Agent, or Firm* — IP Legal Services, LLC

(57) ABSTRACT

Provided are methods and devices for performing positioning in a next-generation wireless network. The method of a UE for performing positioning include identifying configuration information for a transmission bandwidth of a positioning reference signal (PRS) configured per cell and receiving the positioning reference signal corresponding to each cell based on the configuration information for the transmission bandwidth.

9 Claims, 36 Drawing Sheets

(51) Int. Cl.
*H04L 5/00* (2006.01)
*H04W 72/0446* (2023.01)
*H04W 72/0453* (2023.01)
*H04W 72/53* (2023.01)
*H04W 80/02* (2009.01)

(52) U.S. Cl.
CPC ... *H04W 72/0446* (2013.01); *H04W 72/0453* (2013.01); *H04W 72/53* (2023.01); *H04W 80/02* (2013.01)

(58) Field of Classification Search
CPC .......... H04W 4/02; G01S 5/10; H04L 5/0051; H04L 27/2613; H04L 27/2666; H04L 5/001; H04L 5/0064; H04L 5/0048; H04L 5/0082; H04L 5/0092; H04L 5/0032; H04L 5/0023; H04L 5/0069; H04L 5/0073; H04L 5/005; H04L 5/00
See application file for complete search history.

(56) References Cited

U.S. PATENT DOCUMENTS

| | | | |
|---|---|---|---|
| 2012/0122440 | A1 | 5/2012 | Krishnamurthy et al. |
| 2012/0122472 | A1 | 5/2012 | Krishnamurthy et al. |
| 2017/0026799 | A1 | 1/2017 | Sampath et al. |
| 2017/0238298 | A1 | 8/2017 | Wang et al. |
| 2018/0049151 | A1* | 2/2018 | Yoon .................. H04W 64/003 |
| 2018/0049169 | A1 | 2/2018 | Lin et al. |
| 2018/0124787 | A1* | 5/2018 | Wang .................... H04W 64/00 |
| 2018/0302873 | A1* | 10/2018 | Kazmi .................. H04W 24/10 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.9.0, Mar. 2018, pp. 1-645.

* cited by examiner

FIG.17

PRS-Info

```
-- ASN1 START

PRS-Info : := SEQUENCE {
    prs-Bandwidth          ENUMERATED { n6, n15, n25, n50, n75, n100, ... },
    prs-ConfigurationIndex INTERGER (0..4095),
    numDL-Frames           ENUMERATED { sf-1, sf-2, sf-4, sf-6, ..., sf-add-v1420},
    ...,
    prs-MutingInfo-r9      CHOICE {
    prs-BWPIndex           INTEGER (0 .. 3)

-- ASN1STOP
```

FIG.27

PRS-Info

```
-- ASN1 START

PRS-Info ::= SEQUENCE {
    prs-Bandwidth          ENUMERATED { n6, n15, n25, n50, n75, n100, ... },
    prs-ConfigurationIndex INTERGER (0..4095),
    numDL-Frames           ENUMERATED { sf-1, sf-2, sf-4, sf-6, ..., sf-add-v1420},
    ...,
    prs-MutingInfo-r9      CHOICE {
    prs-BWPList

-- ASN1STOP
```

FIG.30

PRS-Info

```
-- ASN1 START

PRS-Info : := SEQUENCE {
    prs-Bandwidth           ENUMERATED { n6, n15, n25, n50, n75, n100, ... },
    prs-ConfigurationIndex  INTERGER (0..4095),
    numDL-Frames            ENUMERATED { sf-1, sf-2, sf-4, sf-6, ..., sf-add-v1420},
    ... ,
    prs-MutingInfo-r9       CHOICE {
    prs-ReportingMode

-- ASN1STOP
```

FIG.33

PRS-Info

```
-- ASN1 START

PRS-Info : := SEQUENCE {
        prs-Bandwidth           ENUMERATED { n6, n15, n25, n50, n75, n100, ... },
        prs-GuardBandwidth prs-ConfigurationIndex  INTERGER (0..4095),
        numDL-Frames            ENUMERATED { sf-1, sf-2, sf-4, sf-6, ..., sf-add-v1420},
        ... ,
        prs-MutingInfo-r9       CHOICE {

-- ASN1STOP
```

METHOD AND DEVICE FOR PERFORMING POSITIONING IN NEXT GENERATION WIRELESS NETWORK

CROSS REFERENCE TO RELATED APPLICATIONS

This application is a National Stage Patent Application of PCT International Patent Application No. PCT/KR2019/004139 (filed on Apr. 8, 2019) under 35 U.S.C. § 371, which claims priority to Korean Patent Application Nos. 10-2018-0043367 (filed on Apr. 13, 2018), and 10-2019-0039653 (filed on Apr. 4, 2019), the teachings of which are incorporated herein in their entireties by reference.

TECHNICAL FIELD

The disclosure proposes methods and devices for measuring the position of a UE in a next-generation wireless access network (hereinafter, "new radio (NR)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE), but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE.

In particular, there is a demand for developing a flexible design for positioning reference signals (PRSs) to be able to support high requirements and various use cases related to UE positioning required in NR.

DETAILED DESCRIPTION OF THE INVENTION

Technical Problem

The disclosure aims to provide a method for flexibly configuring a radio resource used in transmission of a positioning reference signal per cell, in performing positioning in a next-generation wireless network.

The disclosure also aims to provide a specific method for flexibly configuring transmission of reference signal time difference (RSTD) information per UE or per cell, in performing positioning in a next-generation wireless network.

Technical Solution

To achieve the foregoing objectives, according to an embodiment, a method may be provided for performing positioning by a user equipment (UE). The method may include identifying configuration information for a transmission bandwidth of a positioning reference signal (PRS) configured per cell and receiving the positioning reference signal corresponding to each cell based on the configuration information for the transmission bandwidth.

According to an embodiment, a method may be provided for performing positioning by a base station. The method may include configuring configuration information for a transmission bandwidth of a positioning reference signal (PRS) per cell and transmitting the positioning reference signal corresponding to each cell based on the configuration information for the transmission bandwidth.

According to another embodiment, a UE may be provided for performing positioning. The UE may include a controller identifying configuration information for a transmission bandwidth of a positioning reference signal (PRS) configured per cell and a receiver receiving the positioning reference signal corresponding to each cell based on the configuration information for the transmission bandwidth.

According to still another embodiment, a base station may be provided for performing positioning. The base station may include a controller configuring configuration information for a transmission bandwidth of a positioning reference signal (PRS) configured per cell and a transmitter transmitting the positioning reference signal corresponding to each cell based on the configuration information for the transmission bandwidth.

According to an embodiment, a method may be provided for performing positioning by a UE. The method may include identifying configuration information for a positioning reference signal (PRS) configured per cell, receiving a positioning reference signal (PRS) per cell, based on the configuration information, and transmitting, to a base station, a reference signal time difference (RSTD) index corresponding to an interval of an RSTD of the positioning reference signal received per cell, based on information about a preconfigured table. The preconfigured table is configured per cell or per UE, as a reference signal time difference of a plurality of positioning reference signals individually mapped to a plurality of RSTD indexes.

According to another embodiment, a method may be provided for performing positioning by a base station. The method may include configuring configuration information for a positioning reference signal (PRS) per cell, transmitting a positioning reference signal (PRS) per cell, based on the configuration information, and receiving, from a UE, a reference signal time difference (RSTD) index corresponding to an interval of an RSTD of the positioning reference signal received per cell, based on information about a preconfigured table. The preconfigured table is configured per cell or per UE, as a reference signal time difference of a plurality of positioning reference signals individually mapped to a plurality of RSTD indexes.

According to still another embodiment, a UE may be provided for performing positioning. The UE may include a controller identifying configuration information for a positioning reference signal (PRS) configured per cell, a receiver receiving a positioning reference signal (PRS) per cell, based on the configuration information, and a transmitter transmitting, to a base station, a reference signal time difference (RSTD) index corresponding to an interval of an RSTD of the positioning reference signal received per cell, based on information about a preconfigured table. The preconfigured table is configured per cell or per UE, as a reference signal time difference of a plurality of positioning reference signals individually mapped to a plurality of RSTD indexes.

According to still another embodiment, a base station may be provided for performing positioning. The base station may include a controller configuring configuration information for a positioning reference signal (PRS) per cell, a transmitter transmitting a positioning reference signal (PRS) per cell, based on the configuration information, and a receiver receiving, from a UE, a reference signal time difference (RSTD) index corresponding to an interval of an RSTD of the positioning reference signal received per cell, based on information about a preconfigured table. The preconfigured table is configured per cell or per UE, as a reference signal time difference of a plurality of positioning reference signals individually mapped to a plurality of RSTD indexes.

Advantageous Effects

According to the disclosure, there may be provided a method for flexibly configuring a radio resource used in transmission of a positioning reference signal per cell, in performing positioning in a next-generation wireless network.

According to the disclosure, there may be provided a method for flexibly configuring transmission of reference signal time difference (RSTD) information per UE or per cell, in performing positioning in a next-generation wireless network.

BRIEF DESCRIPTION OF DRAWINGS

FIG. 17 is a view illustrating an example of configuration information of a positioning reference signal including bandwidth index information according to an embodiment;

FIG. 27 is a view illustrating an example of configuration information of a positioning reference signal including bandwidth list information according to an embodiment;

FIG. 30 is a view illustrating an example of configuration information of a positioning reference signal including reporting mode information according to an embodiment;

FIG. 33 is a view illustrating an example of configuration information of a positioning reference signal including guard bandwidth information according to an embodiment;

MODE FOR CARRYING OUT THE INVENTION

Figure 1:
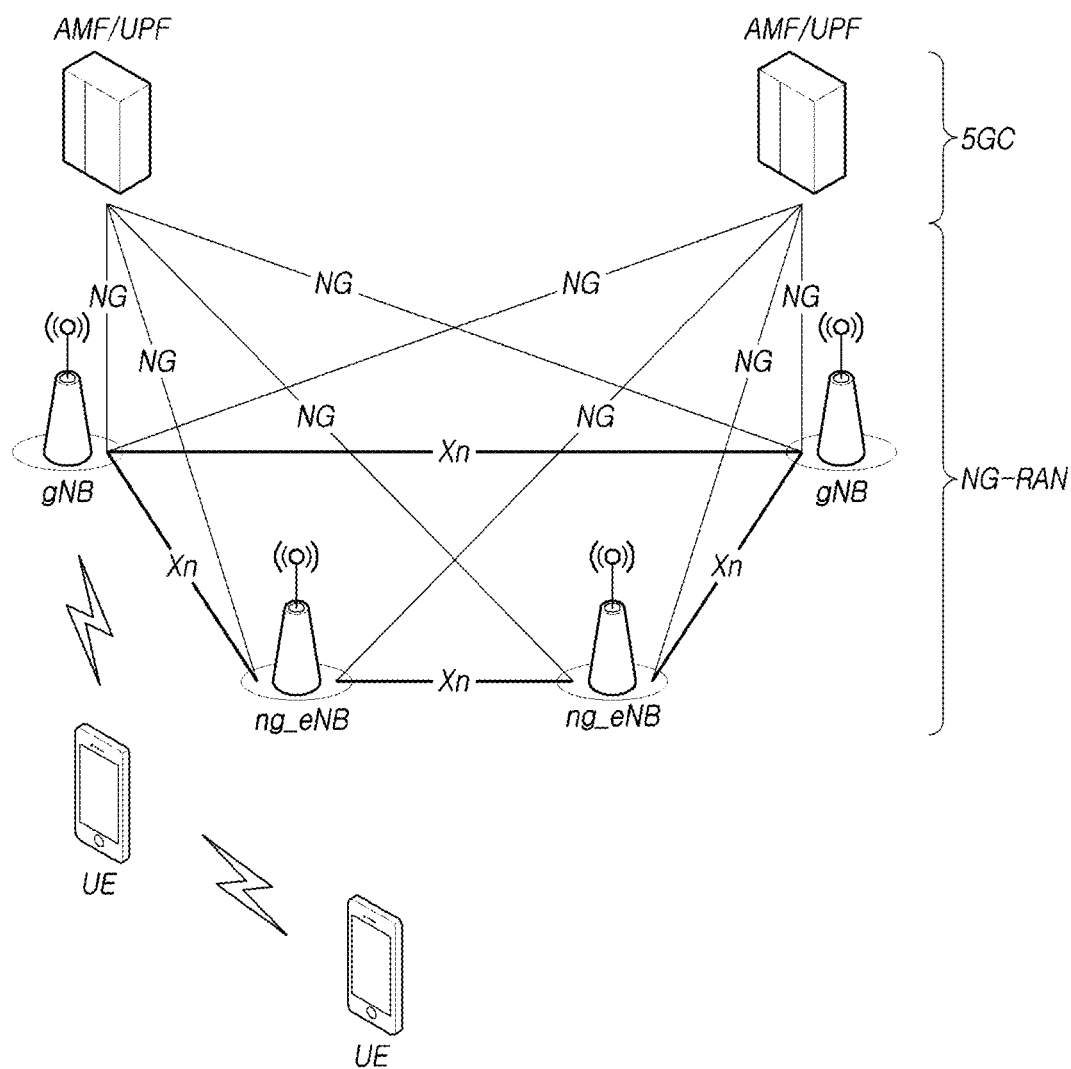
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s). In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression. Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "µ" is used as an exponential value of 2 so as to be changed exponentially on the basis of 15 kHz.

TABLE 1

| µ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
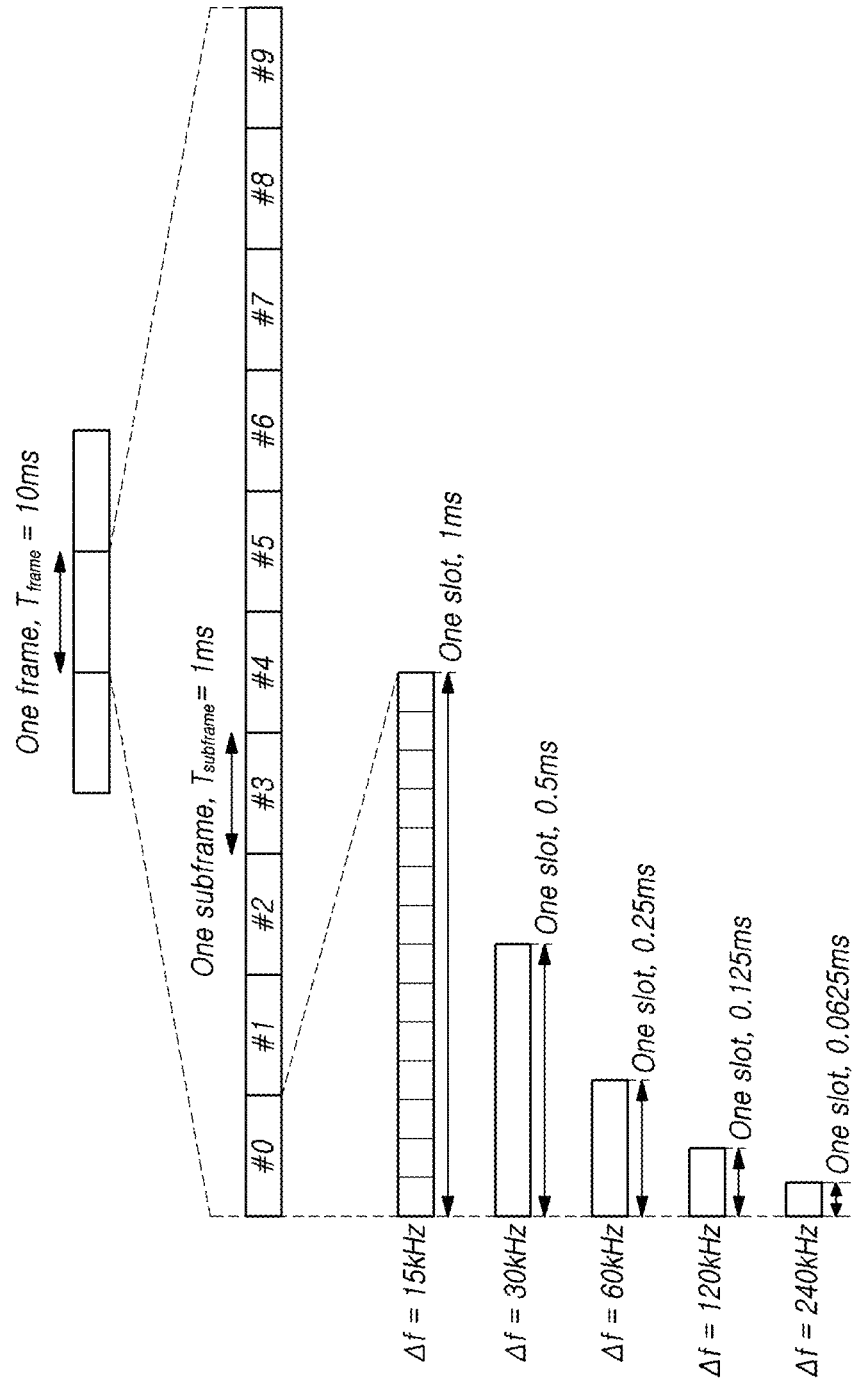
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
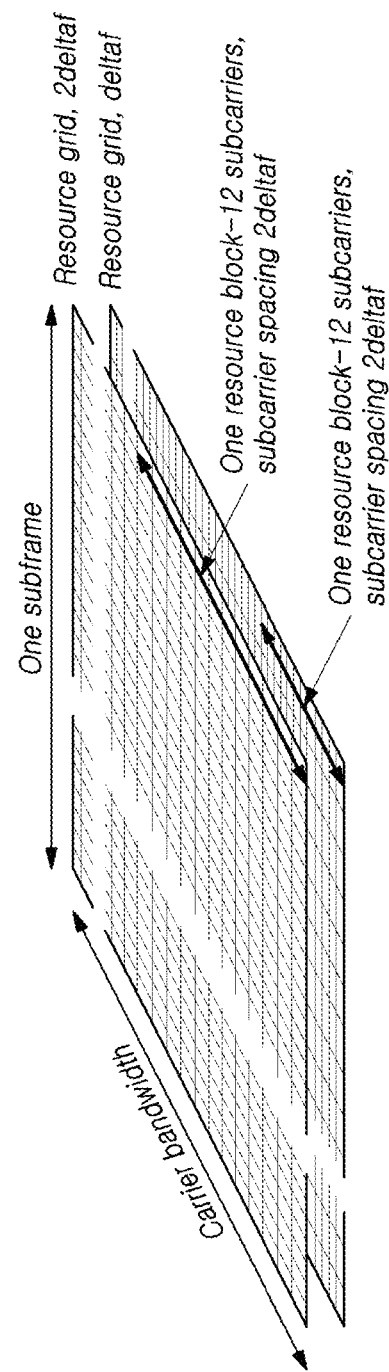
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
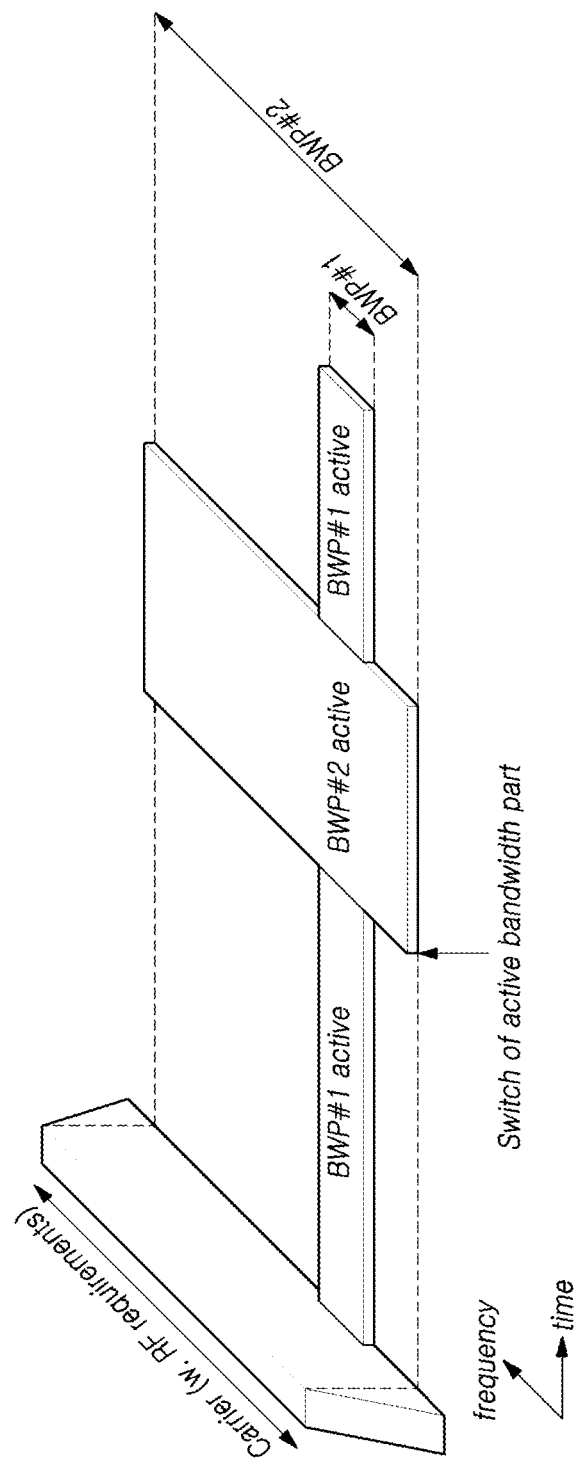
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
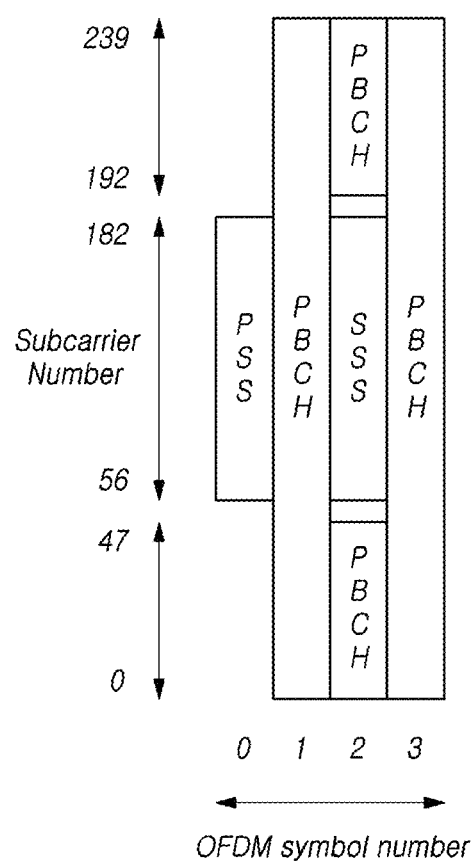
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
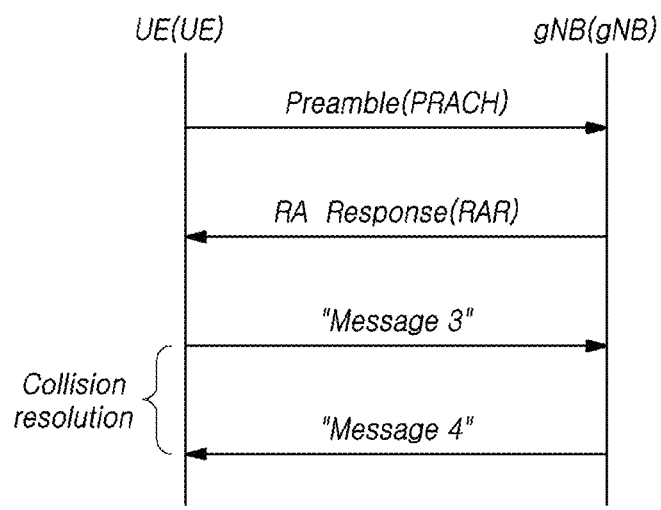
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
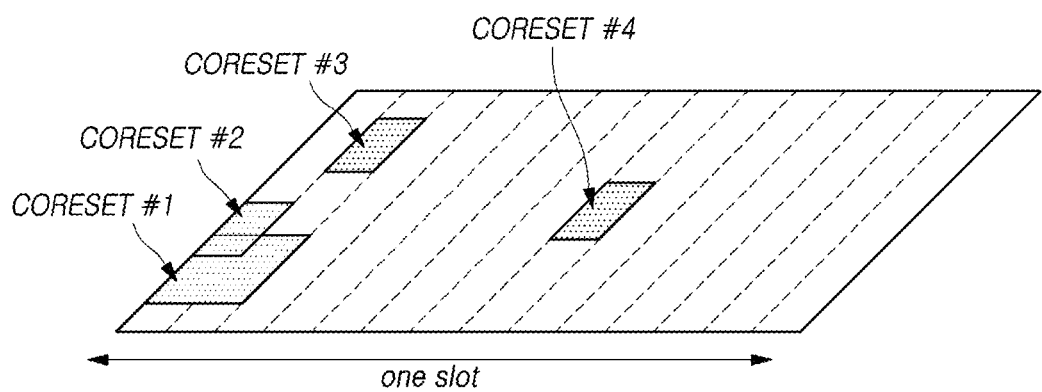
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Recently, the 3GPP has approved the "Study on New Radio Access Technology", which is a study item for research on next-generation/5G radio access technology. On the basis of the Study on New Radio Access Technology, in RAN WG1, discussions have been in progress on frame structures, channel coding and modulation, waveforms, multiple access schemes, and the like for the NR. It is required to design the NR not only to provide an improved data transmission rate, but also to meet various QoS requirements for each detailed and specific usage scenario, compared to the LTE/LTE-Advanced.

In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a subframe has been defined as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation. Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, it may be difficult to satisfy latency requirements. To this end, a mini-slot may be defined to be made up of fewer OFDM symbols than the slot. Thus the scheduling for the latency critical data, such as the URLLC, may be performed based on the mini-slot.

Figure 8:
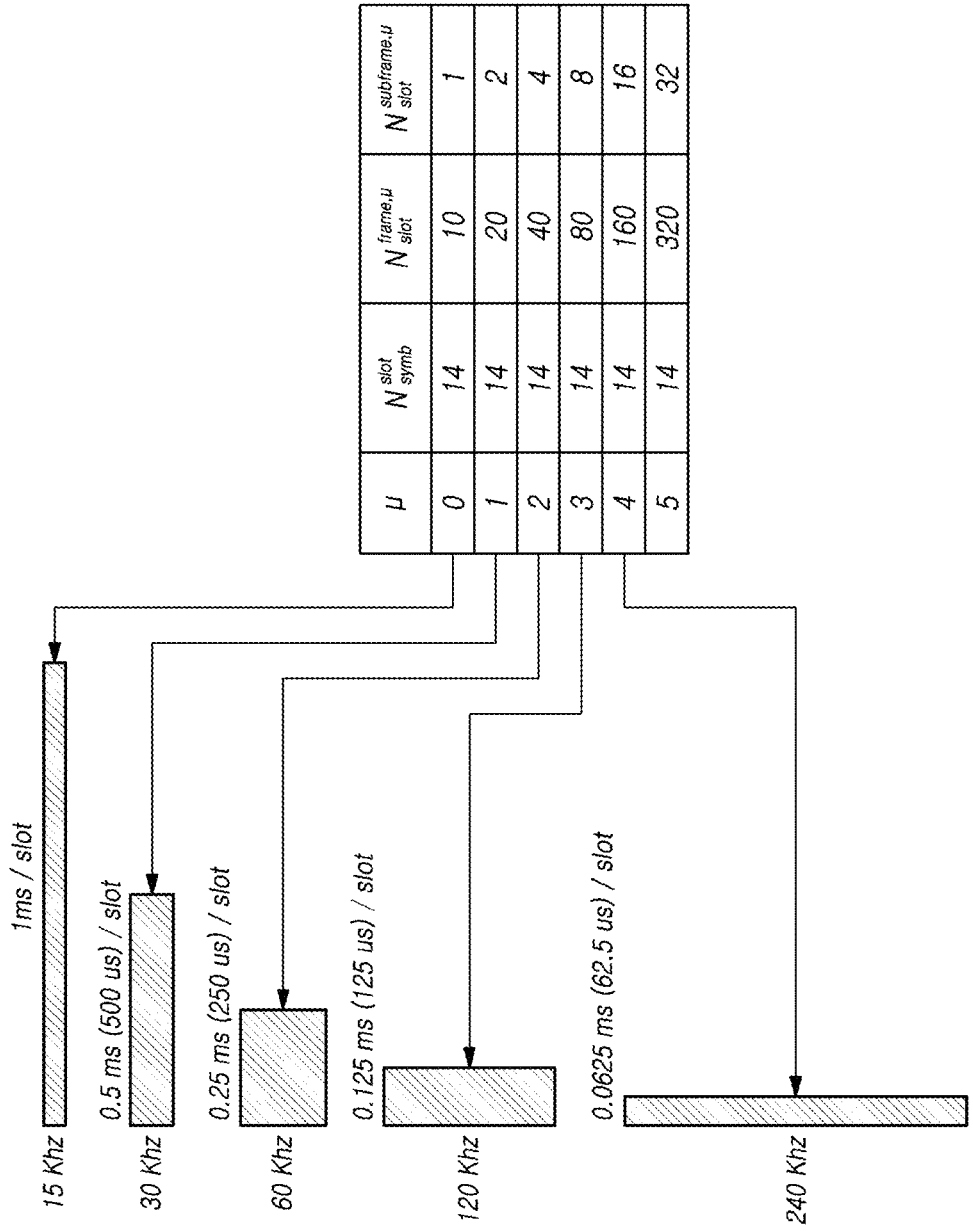
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, because of different SCSs or different TTI lengths are defined in the NR, related technologies have been developed for satisfying requirements of each of the URLLC and the eMBB.

Meanwhile, channel state information (CSI) provides a channel state for a network using a channel state indicator, instead of channel estimation using a typical cell-specific RE (reference signal) (CRS). It is cell-specific, but configured by RRC signaling of a UE. A definition of Channel State Information Reference Signal (CSI-RS) was introduced in LTE Release 10. The CSI-RS is used for allowing a UE to obtain channel state information by estimating demodulation reference signals.

Figure 9:
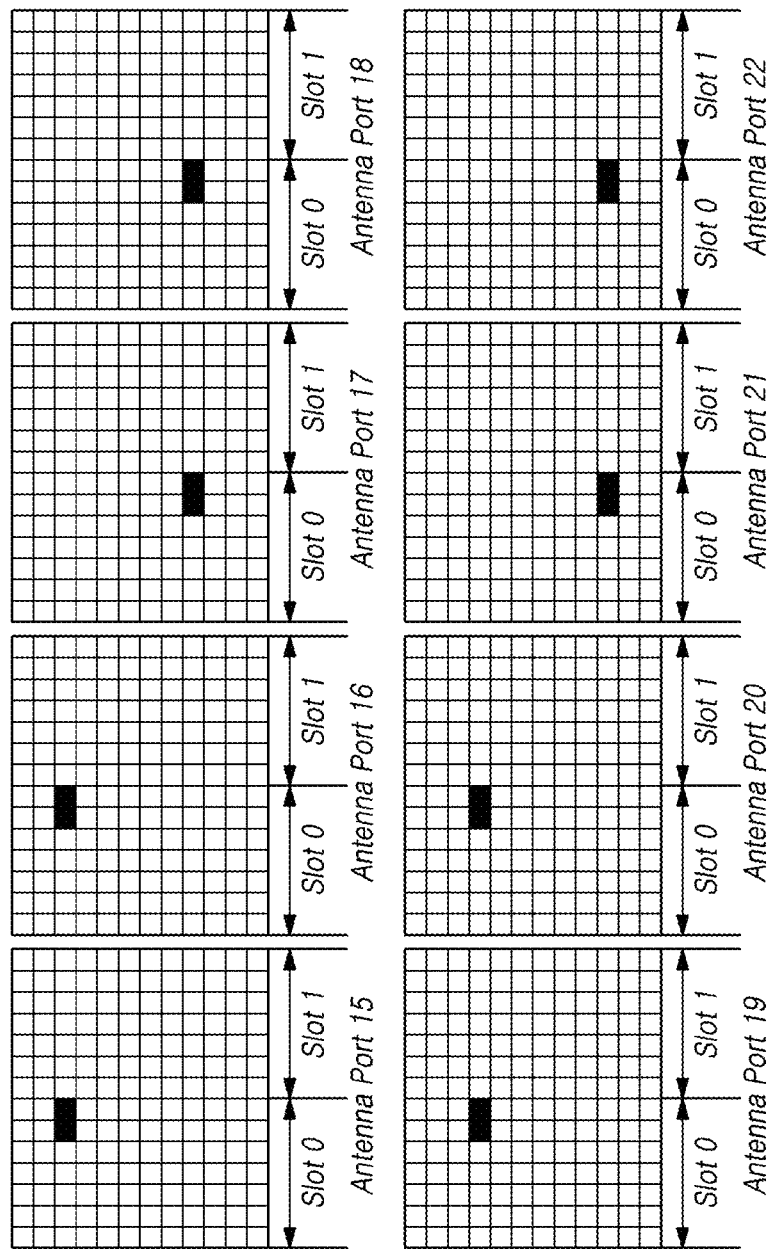
FIG. 9 is a view illustrating an LTE-A CSI-RS structure.

In LTE Rel-8/9, a cell is defined to support a maximum of 4 CRSs. As the LTE evolves from LTE Rel-8/9 to LTE-A (Rel-10), it has been necessary for the CSI to be extended for enabling a cell reference signal to support a maximum 8-layer transmission. Here, antenna ports of 15-22 are allocated as represented in FIG. 9, a transmission periodicity and mapping for resource allocation is determined through RRC configuration. Table 2 defines a mapping method through CSI-RS configuration for normal CP.

TABLE 2

Mapping from CSI reference signal configuration to (k', l') for normal cyclic

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame | 0 | (9,5) | 0 | (9,5) | 0 | (9,5) | 0 |
| structure | 1 | (11,2) | 1 | (11,2) | 1 | (11,2) | 1 |
| type 1 | 2 | (9,2) | 1 | (9,2) | 1 | (9,2) | 1 |
| and 2 | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |

TABLE 2-continued

Mapping from CSI reference signal configuration to (k', l') for normal cyclic

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame | 20 | (11,1) | 1 | (11,1) | 1 | (11,1) | 1 |
| structure | 21 | (9,1) | 1 | (9,1) | 1 | (9,1) | 1 |
| type 2 | 22 | (7,1) | 1 | (7,1) | 1 | (7,1) | 1 |
| only | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

In the NR, the X-port CSI-RS has been finally defined as being allocated to N consecutive/non-consecutive OFDM symbols. Here, the X-ports are CSI-RS ports, where X is a maximum of 32. The CSI-RS is allocated over the N symbols, where N is a maximum of 4.

Figure 10:
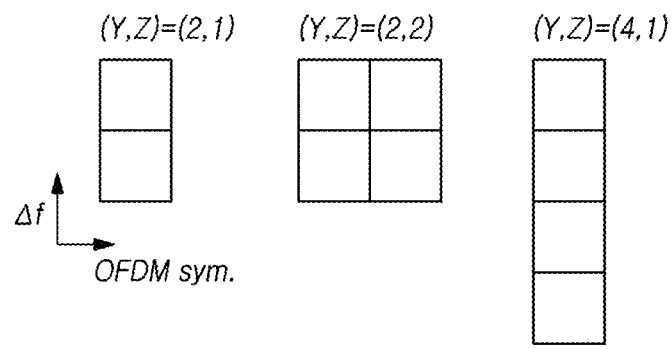
FIG. 10 is a view illustrating NR component CSI-RS RE patterns.

Basically, the CSI-RS has three component resource element (RE) patterns in total as illustrated in FIG. 10. Y and Z represent lengths on the time and frequency axes of CSI-RS RE patterns, respectively.

(Y,Z)∈{(2,1),(2,2),(4,1)}

Figure 11:
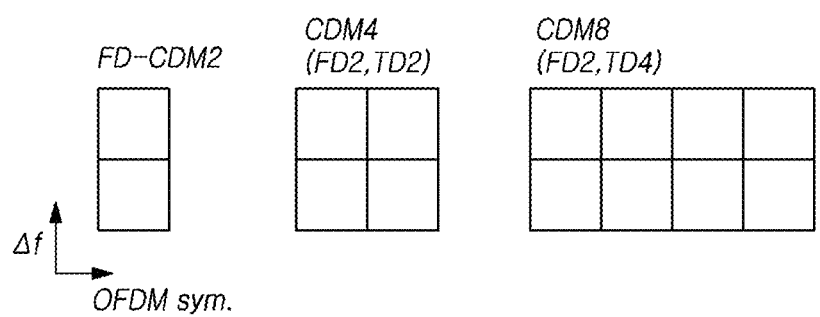
FIG. 11 is a view illustrating NR CDM patterns.

Further, three CDM patterns in total are supported in the NR as illustrated in FIG. 11.

FD-CDM2, CDM4(FD2,TD2), CDM8(FD2,TD4)

Here, following Tables 3 to 6 represent spreading sequences allocated to each CDM pattern in actual.

TABLE 3

The sequences $w_f(k')$ and $w_t(l')$ for CDMType equal to 'no CDM'

| Index | $w_f(k')$ | $w_t(l')$ |
|---|---|---|
| 0 | 1 | 1 |

TABLE 4

The sequences $w_f(k')$ and $w_t(l')$ for CDMType equal to 'FD-CDM2'

| Index | $w_f(k')$ | $w_t(l')$ |
|---|---|---|
| 0 | [+1 +1] | 1 |
| 1 | [+1 −1] | 1 |

TABLE 5

The sequences $w_f(k')$ and $w_t(l')$ for CDMType equal to 'CDM4'

| Index | $w_f(k')$ | $w_t(l')$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

TABLE 6

The sequences $w_f(k')$ and $w_t(l')$ for CDMType equal to 'CDM8'

| Index | $w_f(k')$ | $w_t(l')$ |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

Figure 12:
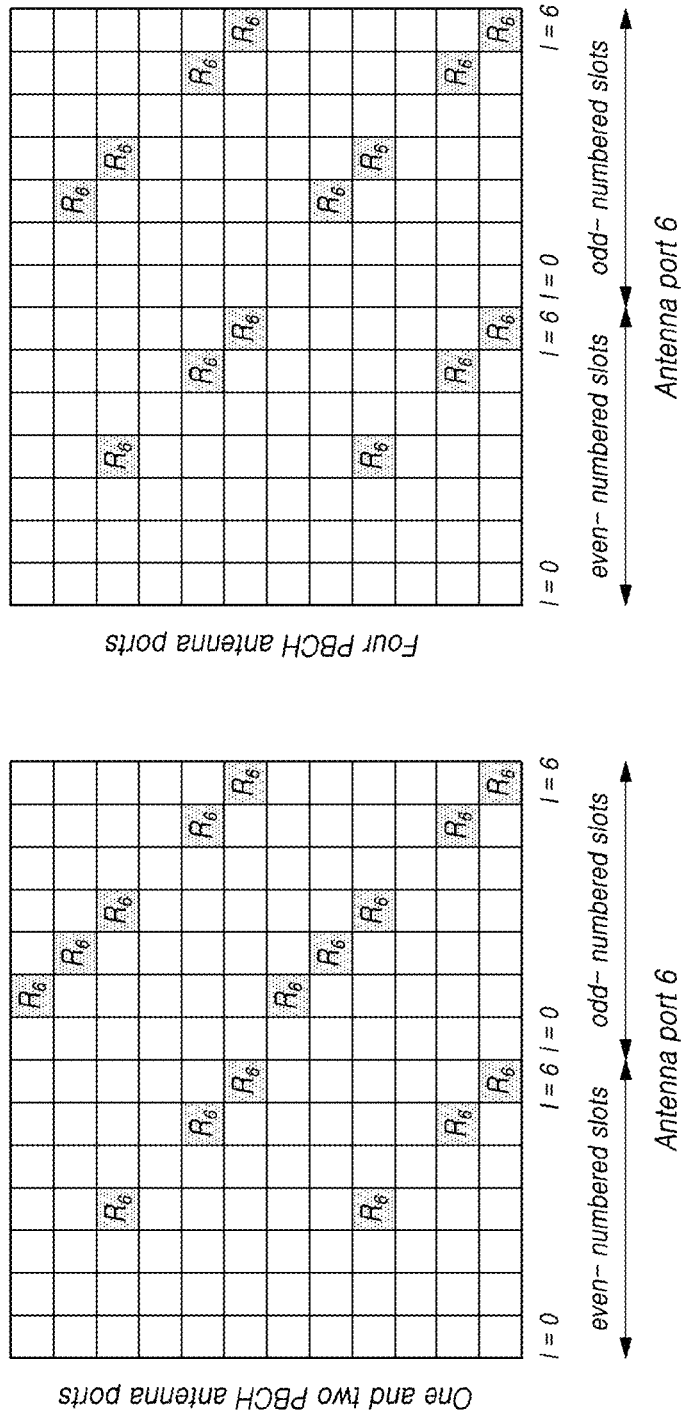
FIG. 12 is a view illustrating mapping of positioning reference signals in case of normal cyclic prefix.

In the LTE, higher-layer signaling may be transmitted via antenna port 6 as illustrated in FIG. 12. Through this, a UE performs position measurement. Basically, a PRS is transmitted to a pre-defined area through higher-layer signaling parameter configuration.

ΔPRS: subframe offset

TPRS: periodicity, 160, 320, 640, 1280 subframes

NPRS: duration (=No. of consecutive subframes), 1, 2, 4, 6 subframes

Basically, the Positioning Reference Signal (PRS) uses a pseudo random sequence, that is, a quasi-orthogonal characteristic sequence. That is, PRS sequences that overlap over code may be separated using this orthogonal characteristic. In frequency domain, as shown in FIG. 12, a total of 6 cells including 5 neighboring cells may be orthogonally allocated using frequency reuse factor=6. Here, a physical cell ID ("PCI") is basically used as an offset value for a frequency domain position of a PRS RE.

Finally, since a collision occurs in case all target cells configure an identical PRS transmission interval in the time domain, PRS transmission may be performed at an orthogonal time interval between specific cells or cell groups by configuring a muting interval per cell.

Figure 13:
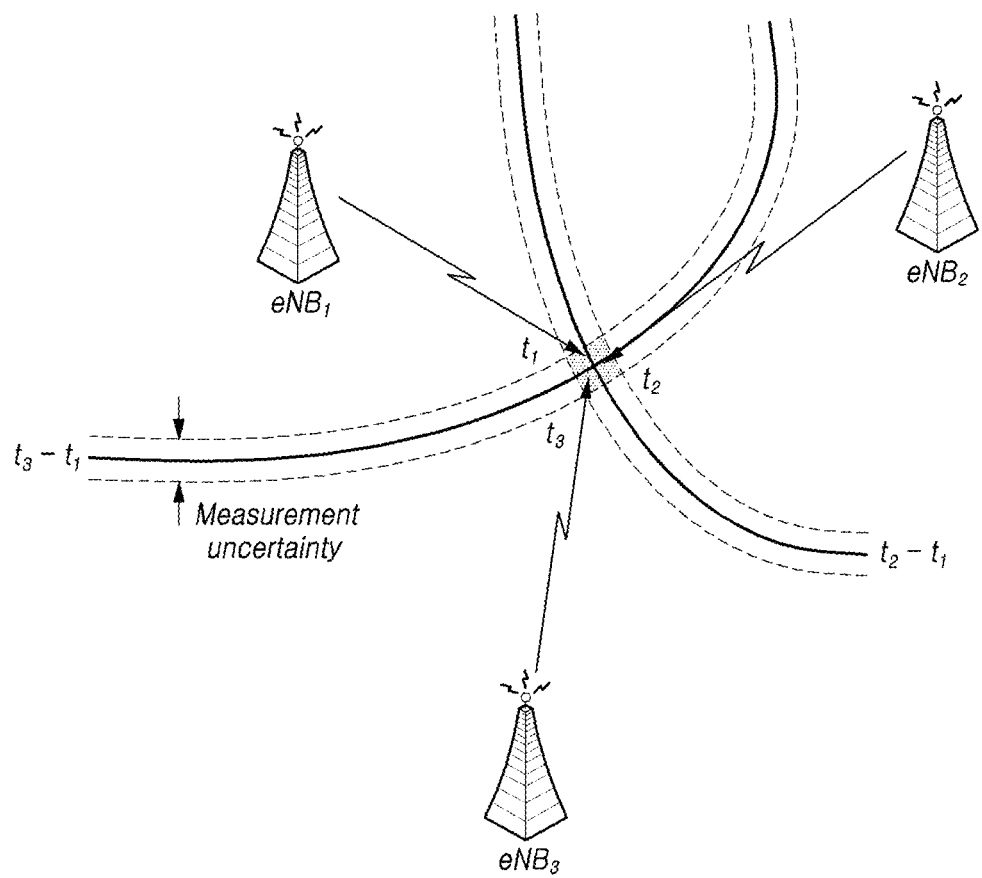
FIG. 13 is a view conceptually illustrating OTDOA-based positioning.

Observed Time Difference Of Arrival (OTDOA) is a representative technique of estimating a received signal time difference (RSTD), which is a difference in time between received signals as a basic principle for position measurement. Its basic principle is such that a position of a UE may be estimated by estimating an overlapping area based on time differences from at least 3 cells as shown in FIG. 13. For the PRS, PRS transmission information for a maximum of 24×3 (3-sectors) cells may be configured for a UE through higher-layer signaling.

Further, the UE is required to report RSTD values estimated for each cell to a corresponding base station. Following Table 7 represents values used for reporting time difference values estimated by the UE.

Basically, intervals from −15391 Ts to 15391 Ts are defined as a reporting range. Up to −4096 Ts RSTD≤4096≤Ts have 1 Ts resolution, and the remaining intervals have 5 Ts resolution.

TABLE 7

RSTD report mapping

| Reported Value | Measured Quantity Value | Unit |
| --- | --- | --- |
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

Additionally, reporting for high resolution is also included in the corresponding standard as in Table 7. These values may be transmitted along with previously estimated RSTD, and reporting using RSTD_delta_0, RSTD_delta_1 is available in −2260 Ts≤RSTD≤10451 Ts, while reporting using all values except for RSTD_delta_1 is available in the intervals of 0000 Ts≤RSTD≤2259 Ts and 10452 Ts≤RSTD≤12711 Ts. Here, 1 Ts is about 9.8 m. The following is a method of calculating based on 15 kHz that is the subcarrier-spacing of the LTE.

SCS=15 kHz, a reference OFDM symbol length=66.7 us 2048 samples are generated on the time axis based on 2048 FFT (oversampling not applied)

a length per sample on the time axis (=1 Ts)=66.7 us/2048 samples in time*(3*108 m/s)=9.8 m

TABLE 8

Relative quantity mapping for higher-resolution RSTD measurement reporting

| Reported Relative Qkuantity Value | Measured Relative Quantity Value, $\Delta_{RSTD}$ | Unit |
| --- | --- | --- |
| RSTD_delta_0 | 0 | $T_s$ |
| RSTD_delta_1 | 0.5 | $T_s$ |
| RSTD_delta_2 | 1.0 | $T_s$ |
| RSTD_delta_3 | 2.0 | $T_s$ |
| RSTD_delta_4 | 3.0 | $T_s$ |
| RSTD_delta_5 | 4.0 | $T_s$ |

There is no design introduced for a positioning reference signal (PRS) that may support a high resolution and various use cases being considered in NR positioning. The present disclosure introduces a positioning reference signal (PRS) configuration method for 5G NR. Hereinafter, methods for designing a positioning reference signal (PRS) capable of meeting high requirements and various use cases and signaling methods will be described below in detail with reference to the relevant drawings.

Figure 14:
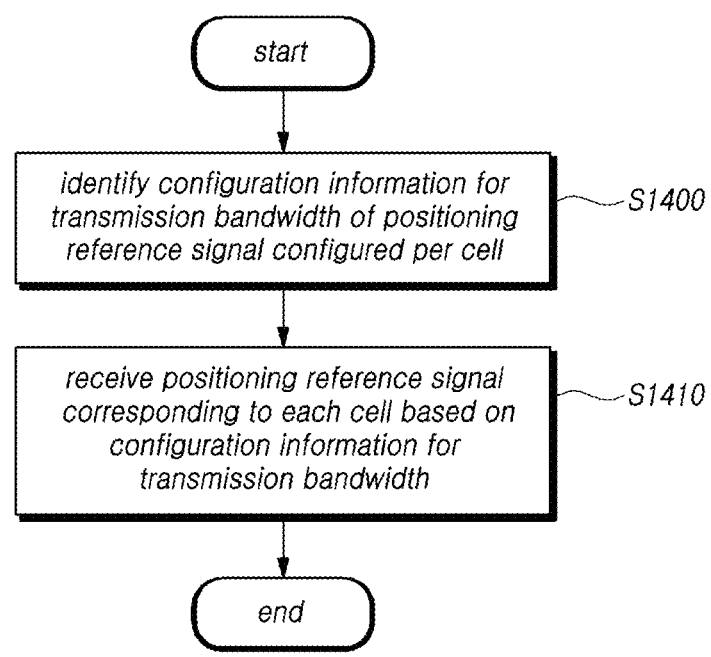
FIG. 14 is a flowchart illustrating a procedure of a UE for performing positioning according to an embodiment.

FIG. 14 is a flowchart illustrating a procedure of a UE for performing positioning according to an embodiment.

Referring to FIG. 14, a UE may identify configuration information for a transmission bandwidth of a positioning reference signal (PRS) configured per cell (S1400).

The transmission bandwidth in which the positioning reference signal for UE positioning is transmitted may be flexibly configured to meet various use scenarios of NR. That is, the positioning reference signal may be transmitted in various transmission bandwidths on a radio resource according to use cases.

According to an embodiment, the configuration information for the transmission bandwidth of the positioning reference signal may be received via higher layer signaling. That is, the base station may select a positioning reference signal transmission bandwidth suitable for the UE's circumstance, and the UE may receive configuration information about the selected transmission bandwidth via higher layer signaling.

In NR, as described above in connection with FIG. 4, the full transmission bandwidth of a single carrier may be split into up to four BWPs, and the BWPs may be indicated via DCI (up to two-bit field). The UEs in the cell may activate different BWPs and use them for transmission of data. For example, among the BWPs configured in the system carrier, a specific BWP for transmitting the positioning reference signal may be configured. In this case, BWP index information, which indicates the BWP where the positioning reference signal (PRS) is transmitted, may be further included in the positioning reference signal (PRS) configuration information according to higher layer signaling. Or, the base station may transmit information regarding the specific BWP to the UEs via DCI using dynamic signaling.

For example, a method of configuring the NR positioning reference signal (PRS) indicating the BWP where the positioning reference signal (PRS) is transmitted may be commonly applied between multiple cells. In such a case, interference control for the positioning reference signal (PRS) may be enabled so that observed time difference of arrival (OTDOA)-based positioning reference signal (PRS) detection may be performed, and detection accuracy may be increased.

For example, the base station may configure multiple BWPs for transmission of the positioning reference signal (PRS). For UEs which support multi-BWP activation, transmission of the positioning reference signal (PRS) may be performed via multiple BWPs. That is, multiple BWPs may be configured as positioning reference signal (PRS) transmission BWPs.

In this case, information about the list of bandwidth parts where the positioning reference signal is transmitted may be added to the existing positioning reference signal (PRS) higher layer configuration information. For example, the multiple BWPs for transmission of the positioning reference signal (PRS) may be selected and configured as consecutive, or non-consecutive BWPs.

For example, the positioning reference signal (PRS) with the multiple BWPs configured therein may be transmitted in the same manner in all the cells. In this case, all the cells follow the same positioning reference signal (PRS) BWP configuration. That is, where a single or multiple specific BWPs for transmission of the positioning reference signal (PRS) are configured, all the cells may transmit the positioning reference signal (PRS) using the same BWPs. Thus, higher layer signaling information for configuring the positioning reference signal (PRS) may be used in all the cells in the same manner.

As another example, the positioning reference signal (PRS) with multiple BWPs configured therein may be transmitted in different BWPs per cell group (gNB group). In such a case, each cell may be configured to use a different BWP per specific group.

That is, per cell group, a different BWP may be used to transmit the positioning reference signal (PRS). By so doing, inter-positioning reference signal (PRS) interference control may be carried out more efficiently. For example, where density on frequency axis of positioning reference signal (PRS) allocation pattern (density per PRB/symbol) is brought high, frequency reuse factor (FRF) is decreased so that more interference may occur between the neighboring cells. However, since positioning reference signal (PRS) density is high, per-cell OTDOA measurement accuracy may increase. At this time, more efficient interference control is possible using a per-cell group BWP splitting method.

For example, upon transmission of a positioning reference signal, the base station may configure one or more specific BWPs and may flexibly configure a time-frequency mapping of per-cell positioning reference signals. In this case, it is assumed that the above-described BWP for transmission of the positioning reference signal (PRS) has been determined between neighboring cells or between multiple cells. At this time, in the BWP for transmission of the positioning reference signal (PRS) per cell, mapping for the positioning reference signal (PRS) pattern may be performed in the time-frequency domain. For example, the positioning reference signal (PRS) may be mapped as follows.

In the case of the positioning reference signal (PRS)'s own mapping, the positioning reference signal (PRS) itself may be newly added to a physical signal in the same manner as typically. That is, upon time-frequency mapping of the positioning reference signal (PRS), a frequency domain shift pattern may be implicitly defined based on cell ID information. According to such a mapping of the cell ID-based positioning reference signal (PRS) pattern, the UE may be precisely aware of the positioning reference signal (PRS) patterns of the neighboring cells, so that detection of per-cell positioning reference signal (PRS) is possible, and per-cell interference control may be facilitated.

In this case, in the configuration information about the transmission pattern for mapping of the positioning reference signal, at least one of the transmission pattern index, frequency domain allocation information, or time domain allocation information for positioning reference signal transmission may be configured in a plurality of different patterns. To that end, a plurality of positioning reference signal transmission patterns individually corresponding to various use scenarios of NR may be previously determined, and a transmission pattern index for each transmission pattern may be determined. If a transmission pattern suitable for the UE's circumstance is selected, transmission pattern index for the selected transmission pattern may be included in the configuration information for the positioning reference signal transmission pattern.

Further, the configuration information for the positioning reference signal transmission pattern may include positioning reference signal density information in the frequency domain, which indicates the number of REs configured in one OFDM symbol per physical resource block (PRB). Further, the configuration information for the positioning reference signal transmission pattern may include density information about the positioning reference signal in the time domain, which indicates the number of OFDM symbols where the positioning reference signal is transmitted per slot.

Further, the configuration information for the positioning reference signal transmission pattern may include location information about the positioning reference signal in the time domain, which indicates the position of the OFDM symbol where the positioning reference signal is transmitted. Further, the configuration information for the positioning reference signal transmission pattern may include starting point information in the frequency domain, of the positioning reference signal RE, and starting point information in the time domain, of the OFDM symbol where the transmission of positioning reference signal starts.

That is, this enables configuration of various positioning reference signal patterns in the radio resource via higher layer signaling as compared with the related art in which only a single pattern is applied to the positioning reference signal.

In the case of channel state information reference signal (CSI-RS) resource mapping, the positioning reference signal (PRS) exists only in the higher layer signaling configuration, and the actual positioning reference signal (PRS) is transmitted as a physical signal via the CSI-RS resource. In this case, the NR CSI-RS may be utilized because the NR CSI-RS allows for the most flexible mapping and generation of a desired positioning reference signal (PRS) pattern. However, since the CSI-RS configuration information is basically UE-specific, it may differ per UE and per cell. Thus, for the UE to be aware of the positioning reference signal (PRS) patterns of all the cells, a default CSI-RS mapping pattern may be defined, and per-cell shift patterns may be performed by adding separate signaling.

The shift pattern of CSI-RS per cell may be configured based on the cell ID, and a shift pattern for each cell may be directly defined.

In this case, the configuration information for the transmission pattern for positioning reference signal mapping may be configured based on configuration information for multiple CSI-RS resources. In this case, the transmission pattern of the positioning reference signal is transmitted to the UE via higher layer signaling, but the positioning reference signal may be transmitted using the CSI-RS resource. That is, a plurality of CSI-RSs may be configured for transmission of the positioning reference signal.

For example, various positioning reference signal transmission patterns may be configured by allocating a plurality of single symbol CSI-RS pattern-based CSI-RS resources. In this case, CSI-RS pattern configuration information may be directly configured for the CSI-RS resource via higher layer signaling. For example, the bitmap indicating the start position in the time domain and the position in the frequency domain, for the CSI-RS pattern, may be provided by the higher layer parameter.

Referring back to FIG. 14, the UE may receive the positioning reference signal corresponding to each cell based on the configuration information for transmission bandwidth (S1410).

The UE may receive the positioning reference signal according to the configuration information for the transmission bandwidth received from the base station. For example, it is assumed that each UE performs PDSCH reception via any activated BWP. In this case, each UE may activate a specific BWP configured to transmit the positioning reference signal for UE positioning and may receive the positioning reference signal. For example, the bandwidth of the specific BWP may be configured to differ per UE or per cell.

For example, where multiple specific BWPs are configured, each UE may activate the multiple specific BWPs configured to transmit the positioning reference signal for UE positioning and receive the positioning reference signal. In this case, the positioning reference signal configured in the multiple BWPs may be transmitted using the same BWP in all the cells. Or, the positioning reference signal configured in the multiple BWPs may be transmitted in a different BWP per cell group (gNB group).

In this case, in a specific bandwidth, the UE may receive the positioning reference signal in the radio resource allocated to transmission of the positioning reference signal based on the configuration information for the positioning reference signal transmission pattern. For example, for positioning the UE, the UE may receive a positioning reference signal from each of the serving cell and at least two or more neighboring cells. The UE may measure reference signal time difference information between the received reference signals.

The UE may transmit RSTD information for the positioning reference signals to the base station. The base station may estimate the crossing area based on the RSTD information. Thus, the UE's position may be estimated.

According to this, it is possible to flexibly configure a radio resource used in transmission of a positioning reference signal per cell, in performing positioning in a next-generation wireless network.

Figure 15:
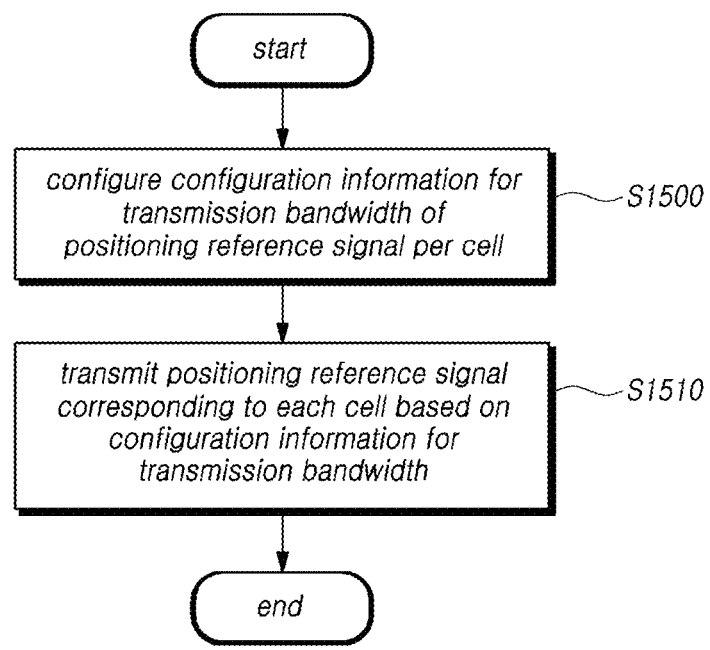
FIG. 15 is a flowchart illustrating a procedure of a base station for performing positioning according to an embodiment.

FIG. 15 is a flowchart illustrating a procedure of a base station performs positioning according to an embodiment.

Referring to FIG. 15, the base station may configure configuration information for the transmission bandwidth of the positioning reference signal per cell (S1500).

The transmission bandwidth in which the positioning reference signal for UE positioning is transmitted may be flexibly configured to meet various use scenarios of NR. That is, the positioning reference signal may be transmitted in various transmission bandwidths on a radio resource according to use cases.

According to an embodiment, the configuration information for the transmission bandwidth of the positioning reference signal may be received via higher layer signaling. That is, the base station may select a positioning reference signal transmission bandwidth suitable for the UE's circumstance and transmit configuration information about the selected transmission bandwidth to the UE via higher layer signaling.

In NR, the full transmission bandwidth of a single carrier may be split into up to four BWPs, and the UEs in the cell may activate different BWPs and use them for data transmission. For example, among the BWPs configured in the system carrier, a specific BWP for transmitting the positioning reference signal may be configured. In this case, BWP index information, which indicates the BWP where the positioning reference signal (PRS) is transmitted, may be further included in the positioning reference signal (PRS) configuration information according to higher layer signaling. Or, the base station may transmit information regarding the specific BWP to the UEs via DCI using dynamic signaling.

For example, a method of configuring the NR positioning reference signal (PRS) indicating the BWP where the positioning reference signal (PRS) is transmitted may be commonly applied between multiple cells. In such a case, interference control for the positioning reference signal (PRS) may be enabled so that observed time difference of arrival (OTDOA)-based positioning reference signal (PRS) detection may be performed, and detection accuracy may be increased.

For example, the base station may configure multiple BWPs for transmission of the positioning reference signal (PRS). For UEs which support multi-BWP activation, transmission of the positioning reference signal (PRS) may be performed via multiple BWPs. That is, multiple BWPs may be configured as positioning reference signal (PRS) transmission BWPs.

In this case, information about the list of bandwidth parts where the positioning reference signal is transmitted may be added to the existing positioning reference signal (PRS) higher layer configuration information. For example, the multiple BWPs for transmission of the positioning reference signal (PRS) may be selected and configured as consecutive, or non-consecutive BWPs.

For example, the positioning reference signal (PRS) with the multiple BWPs configured therein may be transmitted in the same manner in all the cells. In this case, all the cells follow the same positioning reference signal (PRS) BWP configuration. That is, where a single or multiple specific BWPs for transmission of the positioning reference signal (PRS) are configured, all the cells may transmit the positioning reference signal (PRS) using the same BWPs. Thus, higher layer signaling information for configuring the positioning reference signal (PRS) may be used in all the cells in the same manner.

As another example, the positioning reference signal (PRS) with multiple BWPs configured therein may be transmitted in different BWPs per cell group (gNB group). In such a case, each cell may be configured to use a different BWP per specific group.

That is, per cell group, a different BWP may be used to transmit the positioning reference signal (PRS). By so doing, inter-positioning reference signal (PRS) interference control may be carried out more efficiently. For example, where density on frequency axis of positioning reference signal (PRS) allocation pattern (density per PRB/symbol) is brought high, frequency reuse factor (FRF) is decreased so that more interference may occur between the neighboring cells. However, since positioning reference signal (PRS) density is high, per-cell OTDOA measurement accuracy may increase. At this time, more efficient interference control is possible using a per-cell group BWP splitting method.

For example, upon transmission of a positioning reference signal, the base station may configure one or more specific BWPs and may flexibly configure a time-frequency mapping of per-cell positioning reference signals. In this case, it is assumed that the above-described BWP for transmission of the positioning reference signal (PRS) has been determined between neighboring cells or between multiple cells. At this time, in the BWP for transmission of the positioning reference signal (PRS) per cell, mapping for the positioning reference signal (PRS) pattern may be performed in the time-frequency domain. For example, the positioning reference signal (PRS) may be mapped as follows.

In the case of the positioning reference signal (PRS)'s own mapping, the positioning reference signal (PRS) itself may be newly added to a physical signal in the same manner as conventional. That is, upon time-frequency mapping of the positioning reference signal (PRS), a frequency domain shift pattern may be implicitly defined based on cell ID information. According to such a mapping of the cell ID-based positioning reference signal (PRS) pattern, the UE may is precisely aware of the positioning reference signal (PRS) patterns of the neighboring cells, so that detection of per-cell positioning reference signal (PRS) is possible, and per-cell interference control may be facilitated.

In this case, in the configuration information about the transmission pattern for mapping of the positioning reference signal, at least one of the transmission pattern index, frequency domain allocation information, or time domain allocation information for positioning reference signal transmission may be configured in a plurality of different patterns. To that end, a plurality of positioning reference signal transmission patterns individually corresponding to various use scenarios of NR may be previously determined, and a transmission pattern index for each transmission pattern may be determined. If a transmission pattern suitable for the UE's circumstance is selected, transmission pattern index for the selected transmission pattern may be included in the configuration information for the positioning reference signal transmission pattern.

Further, the configuration information for the positioning reference signal transmission pattern may include positioning reference signal density information in the frequency domain, which indicates the number of REs configured in one OFDM symbol per physical resource block (PRB). Further, the configuration information for the positioning reference signal transmission pattern may include density information about the positioning reference signal in the time domain, which indicates the number of OFDM symbols where the positioning reference signal is transmitted per slot.

Further, the configuration information for the positioning reference signal transmission pattern may include location information about the positioning reference signal in the time domain, which indicates the position of the OFDM symbol where the positioning reference signal is transmitted. Further, the configuration information for the positioning reference signal transmission pattern may include starting point information in the frequency domain, of the positioning reference signal RE, and starting point information in the time domain, of the OFDM symbol where the transmission of positioning reference signal starts.

That is, this enables configuration of various positioning reference signal patterns in the radio resource via higher layer signaling as compared with the related art in which only a single pattern is applied to the positioning reference signal.

In the case of channel state information reference signal (CSI-RS) resource mapping, the positioning reference signal (PRS) exists only in the higher layer signaling configuration, and the actual positioning reference signal (PRS) is transmitted as a physical signal via the CSI-RS resource. In this case, the NR CSI-RS may be utilized because the NR CSI-RS allows for the most flexible mapping and generation of a desired positioning reference signal (PRS) pattern. However, since the CSI-RS configuration information is basically UE-specific, it may differ per UE and per cell. Thus, for the UE to be aware of the positioning reference signal (PRS) patterns of all the cells, a default CSI-RS mapping pattern may be defined, and per-cell shift patterns may be performed by adding separate signaling.

The shift pattern of CSI-RS per cell may be configured based on the cell ID, and a shift pattern for each cell may be directly defined.

In this case, the configuration information for the transmission pattern for positioning reference signal mapping may be configured based on configuration information for multiple CSI-RS resources. In this case, the transmission pattern of the positioning reference signal is transmitted to the UE via higher layer signaling, but the positioning reference signal may be transmitted using the CSI-RS resource. That is, a plurality of CSI-RSs may be configured for transmission of the positioning reference signal.

For example, various positioning reference signal transmission patterns may be configured by allocating a plurality of single symbol CSI-RS pattern-based CSI-RS resources. In this case. CSI-RS pattern configuration information may be directly configured for the CSI-RS resource via higher layer signaling. For example, the bitmap indicating the start position in the time domain and the position in the frequency domain, for the CSI-RS pattern, may be provided by the higher layer parameter.

Referring back to FIG. 15, the base station may transmit the positioning reference signal corresponding to each cell based on the configuration information for transmission bandwidth (S1510).

The base station may transmit the positioning reference signal to the UE according to the configuration information for the transmission bandwidth. For example, it is assumed that each UE performs PDSCH reception via any activated BWP. In this case, the base station may activate a specific BWP configured to transmit the positioning reference signal for UE positioning and may transmit the positioning reference signal. For example, the bandwidth of the specific BWP may be configured to differ per UE or per cell.

For example, where multiple specific BWPs are configured, the base station may instruct to activate the multiple specific BWPs configured to transmit the positioning reference signal for UE positioning and transmit the positioning reference signal via the multiple specific BWPs. In this case, the positioning reference signal configured in the multiple BWPs may be transmitted using the same BWP in all the cells. Or, the positioning reference signal configured in the multiple BWPs may be transmitted in a different BWP per cell group (gNB group).

In this case, in a specific bandwidth, the UE may receive the positioning reference signal in the radio resource allocated to transmission of the positioning reference signal based on the configuration information for the positioning reference signal transmission pattern. For example, for positioning the UE, the UE may receive a positioning reference signal from each of the serving cell and at least two or more neighboring cells. The UE may measure reference signal time difference information between the received reference signals.

The base station may receive the RSTD information for the positioning reference signal from the UE. The base station may estimate the crossing area based on the RSTD information. Thus, the UE's position may be estimated.

According to this, it is possible to flexibly configure a radio resource used in transmission of a positioning reference signal per cell, in performing positioning in a next-generation wireless network.

Hereinafter, each embodiment for configuration of multiple cell positioning reference signals considering a BWP newly introduced in NR will be described below in detail with reference to the accompanying drawings.

A use case that is mainly introduced in association with the NR positioning basically refers to positioning use case and accuracy in TR 22.862. This is summarized in Table 9 below.

TABLE 9

SMARTER Use Cases and Potential Positioning Requirements

| Use case | Accuracy |
|---|---|
| Higher accuracy positioning outdoor with high speed moving | <1 m Up to 200 km/h |
| Higher accuracy positioning with low speed moving (including indoor and outdoor) | <1 m Indoor and Outdoor |
| Higher accuracy positioning for low attitude UAV in critical condition (e.g. Drones) | Remote control(Outdoor): 0.5 m Horizontal0.3 m Vertical Data analysis(Outdoor): 0.1 m Horizontal0.1 m Vertical |
| Higher accuracy positioning for mIoT | Wearables(Outdoor/Indoor): 2 m Horizontal Patient location (in Hospital): 3 m Horizontal Patient location (out Hospital): 200 m Horizontal |

Summarizing NR requirements, higher resolution than that of LTE should be provided and also various use cases should be supported. Further, the bandwidth part (BWP) newly introduced in NR should be further considered. In NR, the full transmission bandwidth of a single carrier may be split into up to four BWPs, and an indication of the BWPs is dynamically performed via DCI (up to 2-bit field). Thus, a specific embodiment for signaling and designing a flexible pattern-based positioning reference signal (PRS) capable of supporting various use cases of NR considering the BWP is described below.

In a first embodiment, upon transmission of a positioning reference signal, the base station may configure a specific BWP and accordingly transfer the information to the UEs via higher layer signaling (RRC)/dynamic signaling (DCI).

First, transmission of the positioning reference signal (PRS) considering a configuration for all the BWPs may be taken into account. That is, upon transmission of the positioning reference signal (PRS), data transmission may not be performed as default. Further, since the same configuration is assumed between neighboring cells, it is preferable to configure a transmission band for the positioning reference signal (PRS) under the assumption of the same band. However, in relation to the BWP operation of NR, the BWP to be activated and used may differ per UE.

Thus, according to an embodiment of the disclosure, where a BWP is configured in each cell/between cells, a specific BWP may be defined as a reference BWP or positioning reference signal (PRS) transmission BWP for transmission of the positioning reference signal (PRS). Here, the reference BWP or positioning reference signal transmission BWP is an example term denoting the bandwidth part where the positioning reference signal is transmitted, and is not limited to the name. In this case, all the UEs may activate the same defined BWP and receive the positioning reference signal (PRS). Here, the size of the reference BWP where the positioning reference signal (PRS) is transmitted may be set to be the same as default. However, this is merely an example, and embodiments of the disclosure are not limited thereto and, in some cases, the size of the reference BWP may be set to differ.

Figure 16:
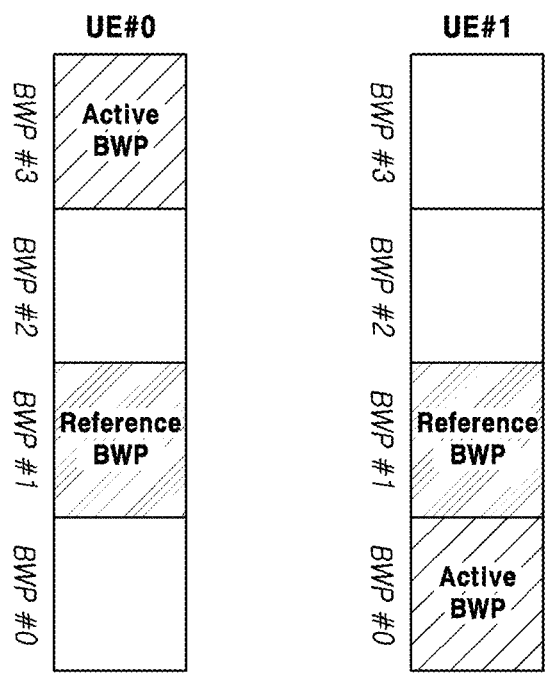
FIG. 16 is a view illustrating a configuration of a bandwidth part used to transmit a positioning reference signal according to an embodiment.

That is, as shown in FIG. 16, a different BWP may be activated and used for each UE in the cell. In the 3GPP Rel-15 standard, the NR UE activates and uses only one BWP. Further, although a BWP for initial access is determined, a BWP to be actually used may be freely set by the scheduler. Thus, in such a case, the base station (gNB) needs to define a specific BWP which may be commonly sued by all the UEs for transmission of the positioning reference signal (PRS) as shown in FIG. 16. For example, the positioning reference signal (PRS) transmission BWP may be termed as follows.

Reference BWP: A BWP separately defined to transmit the positioning reference signal (PRS).

Initial access BWP: A BWP which the UE first attempts to access.

The two BWPs above may be collectively referred to as a BWP or be differentiated using different terms but share the same principle of being commonly used by the UEs upon transmission of the positioning reference signal (PRS). To that end, for example, the BWP information may be configured to be included in the existing positioning reference signal (PRS) configuration information as shown in FIG. 16.

FIG. 17 is a diagram for describing a higher layer signaling configuration method in NR based on the legacy LTE positioning reference signal (PRS) configuration information. That is, the legacy positioning reference signal (PRS) configuration information may be reused as it is, and BWP index information indicating the BWP where the positioning reference signal (PRS) is transmitted may be further included. Although 'prs-BWPIndex' is specified in the proposed example, this is merely an example, but embodiments are not limited thereto but may rather be applied in the form of other information field.

The above-described NR positioning reference signal (PRS) configuration method may be commonly applied between multiple cells. In such a case, interference control for the positioning reference signal (PRS) may be enabled so that observed time difference of arrival (OTDOA)-based positioning reference signal (PRS) detection may be performed, and detection accuracy may be increased.

According to the configuration, although data transmission is still possible in other BWPs, the positioning reference signal (PRS) may be transmitted only in the PRS-BWP between multiple cells configured for transmission of the positioning reference signal (PRS).

According to an embodiment, upon transmission of the positioning reference signal (PRS), the base station (gNB) may configure a specific BWP and may flexibly define a time-frequency mapping of the positioning reference signal (PRS) for each cell.

For example, it is assumed that the above-described BWP for transmission of the positioning reference signal (PRS) has been determined between neighboring cells or between multiple cells. At this time, mapping for the positioning reference signal (PRS) pattern may be actually performed in the time-frequency domain per cell. For example, two positioning reference signal (PRS) mapping circumstances may be assumed as follows.

Positioning reference signal (PRS) itself mapping

Positioning reference signal (PRS) higher layer signaling+channel state information reference signal (CSI-RS) resource mapping In the case of the positioning reference signal (PRS)'s own mapping, the positioning reference signal (PRS) itself may be newly added to a physical signal in the same manner as typically. That is, upon time-frequency mapping of the positioning reference signal (PRS), a frequency domain shift pattern may be implicitly defined based on cell ID information. According to such a mapping of the cell ID-based positioning reference signal (PRS) pattern, the UE may is precisely aware of the positioning reference signal (PRS) patterns of the neighboring cells, so that detection of per-cell positioning reference signal (PRS) is possible, and per-cell interference control may be facilitated.

In the case of channel state information reference signal (CSI-RS) resource mapping, the positioning reference signal (PRS) exists only in the higher layer signaling configuration, and the actual positioning reference signal (PRS) is transmitted as a physical signal via the CSI-RS resource. In this case, the NR CSI-RS may be utilized because the NR CSI-RS allows for the most flexible mapping and generation of a desired positioning reference signal (PRS) pattern. However, since the CSI-RS configuration information is basically UE-specific, it may differ per UE and per cell. Thus, for the UE to be aware of the positioning reference signal (PRS) patterns of all the cells, a default CSI-RS mapping pattern may be defined, and per-cell shift patterns may be performed by adding separate signaling.

The shift pattern of CSI-RS per cell may be configured based on the cell ID, and a shift pattern for each cell may be directly defined.

Further, in the case of the above-described positioning reference signal (PRS) itself mapping and channel state information reference signal (CSI-RS) resource mapping, a PRS pattern shift field may be added. For example, if configured with on/off 1 bit field, cell ID information may be used when the PRS-pattern-shift is 'on' and a directly configured value may be used when the PRS-pattern-shift is 'off.' For example, a positioning reference signal (PRS) itself mapping method will be described below. A positioning reference signal (PRS) supporting a flexible pattern may be adopted to support various use cases required in NR.

To that end, for example, the base station may configure the positioning reference signal pattern suitable for the UE use case via higher layer signaling. This may mean that various positioning reference signal patterns are directly selected by the network and indicated to the UE.

For example, the positioning reference signal configuration-related information provided to the UE may include information, such as positioning reference signal transmission bandwidth, positioning reference signal (PRS) configuration index, number of consecutive positioning reference signal subframes, and positioning reference signal (PRS) muting pattern. The positioning reference signal configuration index may provide the positioning reference signal transmission period and shielding film offset information as shown in Table 10 below.

TABLE 10

Positioning reference signal subframe configuration

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | Reserved | |

In contrast to the related art in which only a predefined single pattern is used in all the cells as the default pattern of positioning reference signal, various pieces of pattern information of positioning reference signal dependent upon various use cases need to be newly added in NR. For example, in the positioning reference signal pattern information, the following information may be directly and newly included, or be included in the form of a positioning reference signal (PRS) pattern configuration index.

Positioning reference signal (PRS) pattern index: may indicate information to define the positioning reference signal pattern's own pattern. For example, the increasing pattern/fixed pattern of subcarrier index of the positioning reference signal RE may be defined depending on the OFDM symbol. However, without limitations thereto, various irregular patterns may be defined.

PRS density in frequency domain: in the LTE positioning reference signal, the positioning reference signal density ($\rho$) is set to 2 REs/symbol/PRB as shown in FIG. 12. However, according to the disclosure, the positioning reference signal density may be defined as various values 1/2/3/4/ . . . /12, as well as $\rho=2$.

PRS location in time domain: in the typical LTE positioning reference signal, the OFDM symbol position where the reference signal is transmitted is fixed in the LTE normal CP case as shown in FIG. 12. However, according to the disclosure, the transmission position of the positioning reference signal may be freely determined by the base station. For example, in the NR 14-symbol slot, up to 14 OFDM symbols may be selected to transmit the positioning reference signal. Thus, the corresponding field may be defined with, e.g., PRS location in time domain or PRS_mapping_time information and may be expressed as 14-bit information, such as [$I_0$, $I_1$, $I_2$, $I_3$, . . . I13]. For example, if this information is set to [00111111111111], the positioning reference signal may be transmitted in the OFDM symbols in the entire NR slot except for the first two OFDM symbols. The information means being newly transmitted in N bits, and the above-described definition of 14 bits is an example.

Positioning reference signal (PRS) starting point in frequency domain: This may mean the starting position of the positioning reference signal RE in the disclosure. In the LTE positioning reference signal, the starting point in frequency domain of the positioning reference signal RE is implicitly determined by the physical cell ID (PCID). Thus, there is a procedure in which if its own serving cell PCID is obtained, the positioning reference signal pattern is automatically recognized by the UE. However, in the NR positioning reference signal, such starting point in frequency domain or frequency domain offset may be directly indicated to support a more flexible positioning reference signal structure. The value of the information may have an NR PCID or may be determined within a specific range. For example, in NR, the PCID has a range of 0, 1, 2, . . . , and 1007 (1008 count). Thus, a PCID within the range may be arbitrarily designated and be transmitted to the UE, or a range may be determined considering the maximum neighbor cell list range. For example, in LTE, for up to 24 cells, a neighboring cell list is transferred to the UE via positioning reference signal configuration information. Or, the positioning reference signal starting point may be determined based on the frequency reuse factor. For example, if the number of positioning reference signal REs per OFDM symbol is two, the frequency reuse factor becomes 6. That is, since there are up to six orthogonal allocation patterns, the frequency domain offset information may be transferred via less, 6-bit information.

Positioning reference signal (PRS) starting point in time domain: this may mean the information indicating the starting OFDM symbol position where the positioning reference signal is transmitted. Where the above-described information of positioning reference signal (PRS) location in time domain is absent, the information of starting position in time domain may be further needed. The range of the information may be determined from among (0, 1, to 13) based on the 14 OFDM slot.

A specific example of defining a positioning reference signal (PRS) configuration pattern using the above-described NR positioning reference signal configuration information has been described above in connection with FIGS. 18 to 21.

Figure 18:
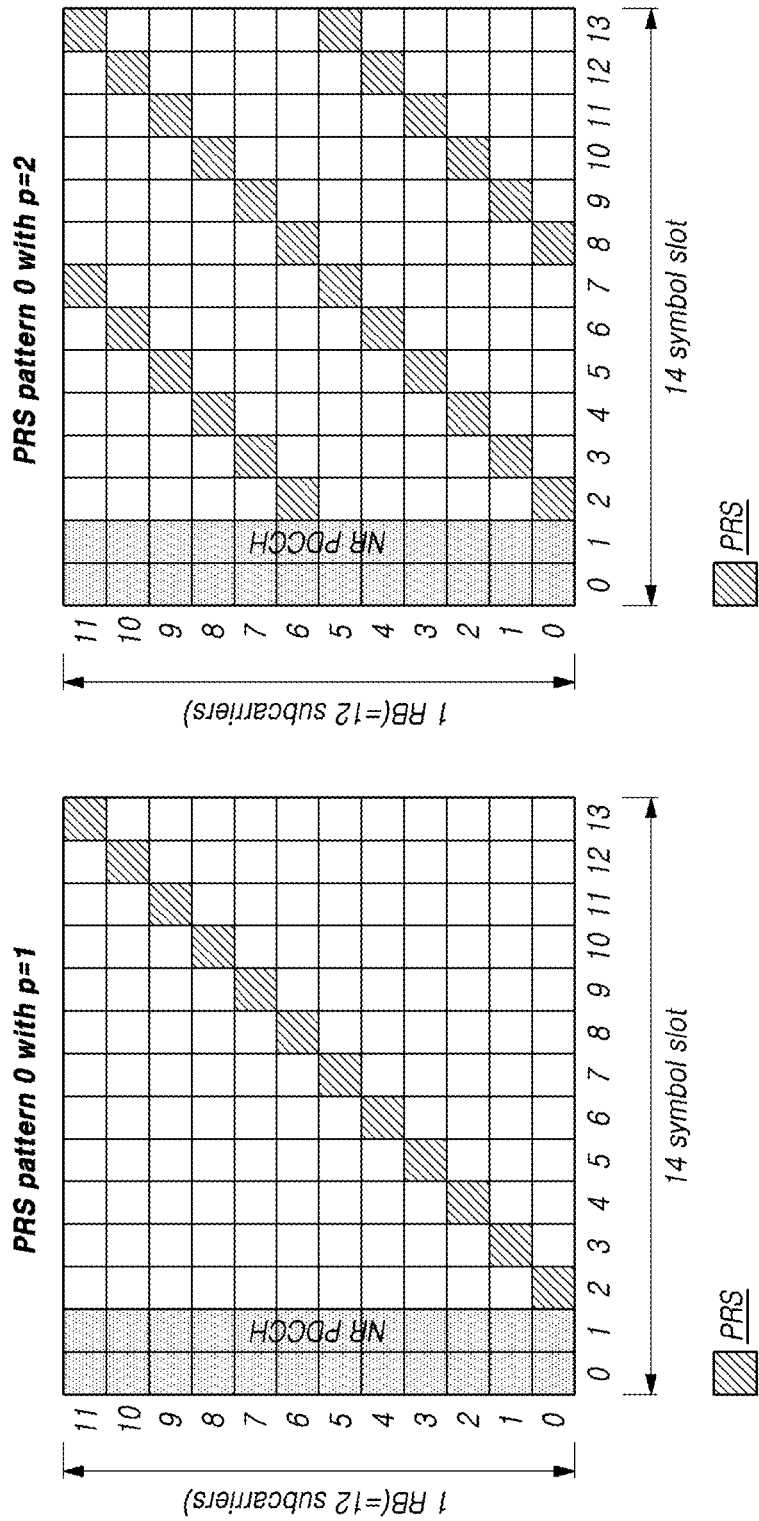
FIGS. 18 and 19 are views illustrating an example (ramping pattern) of a pattern configuration of an NR positioning reference signal according to an embodiment.
Figure 19:
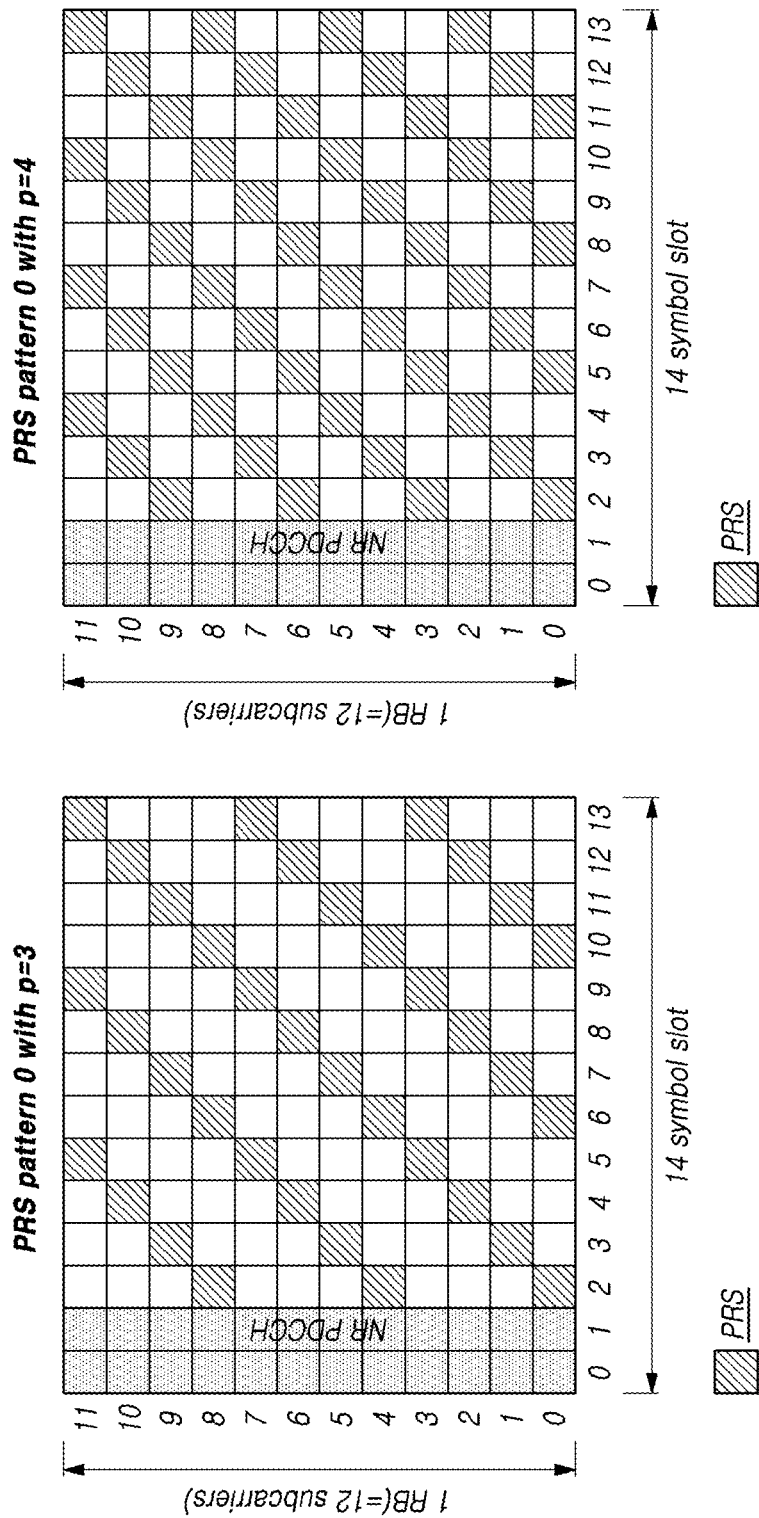

As shown in FIGS. 18 and 19, PRS pattern=0 may be set in the pattern of ramping (SC index increase) as the same OFDM symbol index as LTE increases. FIG. 18 illustrates the case where the positioning reference signal density ($\rho$) is 1 or 2 REs/symbol/PRS, and FIG. 19 illustrates the case where the positioning reference signal density ($\rho$) is 3 or 4 REs/symbol/PRS.

Figure 20:
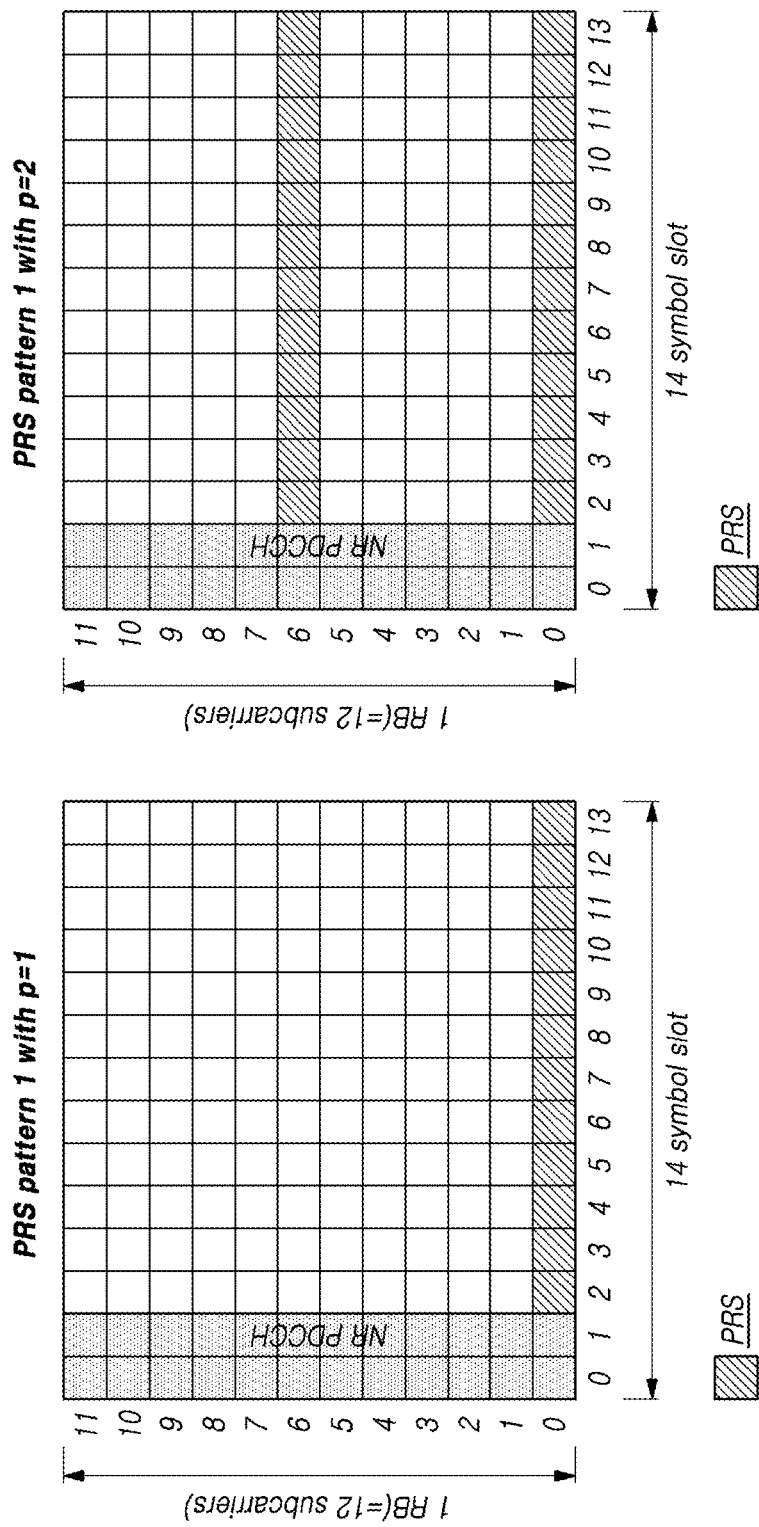
FIGS. 20 and 21 are views illustrating an example (fixed pattern) of a pattern configuration of an NR positioning reference signal according to an embodiment.
Figure 21:
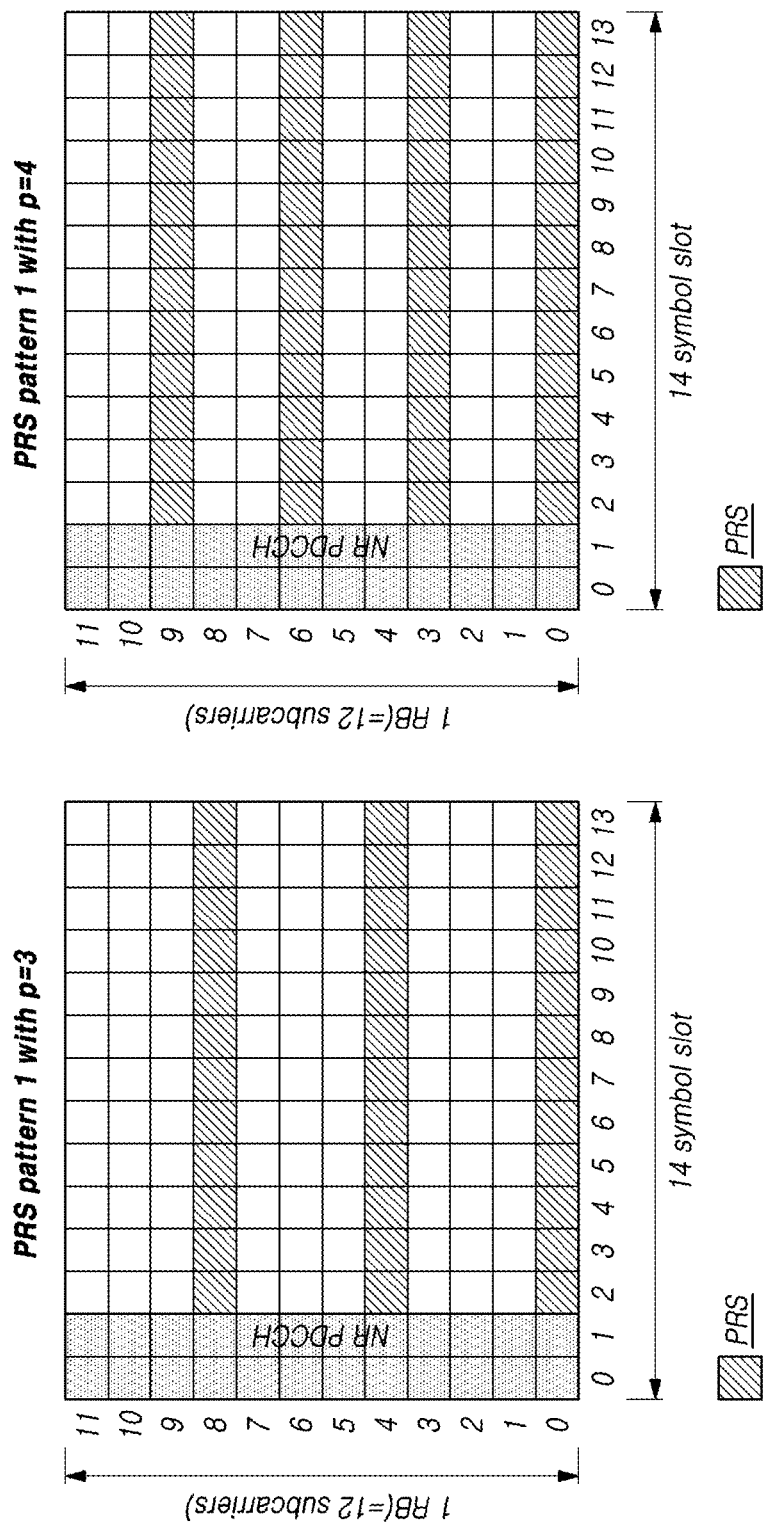

As shown in FIGS. 20 and 21, PRS pattern=1 may be set in a pattern fixed regardless of the OFDM symbol index. FIG. 20 illustrates the case where the positioning reference signal density ($\rho$) is 1 or 2 REs/symbol/PRS, and FIG. 21 illustrates the case where the positioning reference signal density ($\rho$) is 3 or 4 REs/symbol/PRS.

As another example, a channel state information reference signal (CSI-RS) resource mapping method will be described below. A multiple CSI-RS resource configuration may be used for a flexible positioning reference signal pattern configuration.

In this case, in the positioning reference signal pattern configuration, the corresponding is transmitted to the UE via higher layer signaling, but the actual positioning reference signal may be transmitted using the CSI-RS resource. Basically, the NR CSI-RS defines 1-symbol CSI-RS pattern as shown on the two upper cases, first and second rows, in Table 11, and provides a category in which the CSI-RS RE density ($\rho$) may have a value of one or more.

For example, multiple NR CSI-RS resources may be configured for the purpose of transmitting a positioning reference signal. Unlike LTE, NR has no cell-specific reference signal RS. That is, all RSs have the nature of being UE-specific. Since among such RSs, the CSI-RS has the characteristic of flexible configuration, the case where the corresponding CSI-RS location table is shown as third to fifth rows in Table 11 may be added to provide various densities of positioning reference signal. In Table 11, the case where the CSI-RS RE density ($\rho$) shown in the third to fifth rows is 2, 4, 6, or 12 may be added as a new CSI-RS pattern. Such new CSI-RS pattern may add other category or be included in part of the table proposed, as necessary.

That is, according to the disclosure, an intended positioning reference signal pattern may be defined by allocating multiple (N) single symbol CSI-RS pattern-based CSI-RS resources.

TABLE 11

| CSI-RS locations within a slot | | | | | | |
|---|---|---|---|---|---|---|
| Row | Ports | Density | CDMtype | ($\bar{k}$, $\bar{l}$) | k' | l' |
| 1 | 1 | 3 | No CDM | ($k_0$, $I_0$), ($k_0$ + 4, $I_0$), ($k0$ + 8, $I_0$) | 0 | 0 |
| 2 | 1 | 1, 0.5 | No CDM | ($k_0$, $I_0$) | 0 | 0 |
| X | 1 | 2 | No CDM | ($k_0$, $I_0$), ($k_0$ + 6, $I_0$) | 0 | 0 |
| X | 1 | 4 | No CDM | ($k_0$, $I_0$), ($k_0$ + 3, $I_0$), ($k_0$ + 6, $I_0$), ($k_0$ + 9, $I_0$) | 0 | 0 |
| X | 1 | 6 | No CDM | ($k_0$, $I_0$), ($k_0$ + 2, $I_0$), ($k_0$ + 4, $I_0$), ($k_0$ + 6, $I_0$), ($k_0$ + 8, $I_0$), ($k_0$ + 10, $I_0$) | 0 | 0 |

TABLE 11-continued

| CSI-RS locations within a slot | | | | | | |
|---|---|---|---|---|---|---|
| Row | Ports | Density | CDMtype | ($\bar{k}$, $\bar{l}$) | k' | l' |
| X | 1 | 12 | No CDM | ($k_0$, $I_0$), ($k_0$ + 1, $I_0$), ($k_0$ + 2, $I_0$), ($k_0$ + 11, $I_0$) | 0 | 0 |

Described below is a specific embodiment of defining a positioning reference signal pattern using the above-defined single symbol CSI-RS pattern information.

For example, CSI-RS pattern configuration information may be directly configured for the CSI-RS resource. That is, a mapping position may be set in each of the frequency domain and the time domain. Position allocation information may be provided in the higher-layer parameter CSI-RS-ResourceMapping of RRC signaling for the actual NR CSI-RS configuration. A specific range may be set as follows within an in-slot symbol interval (0~13 symbol index), frequency interval (0~11 Subcarrier index) range.

Time domain indication: The time-domain locations $l_0$ and $l_1$ are defined relative to the start of a slot with the starting positions of a CSI-RS in a slot i∈{0, 1, . . . , 13} configured by the higher-layer parameter CSI-RS-ResourceMapping.)

Frequency domain indication: The frequency-domain location is given by a bitmap provided by the higher-layer parameter CSI-RS-ResourceMapping where $k_i$ in Table 7.4.1.5.2-1 (Table 11, refer to TS38.211) corresponds to the $i^{th}$ set bit in the bitmap, starting from $b_0$, with the bitmap and value of $k_i$ given by

[$b_{11}$ . . . $b_0$], $k_i$=f(i) for row 2 of Table 7.4.1.5.2-1=>$\rho$=1(12 bit)

[$b_3$ . . . $b_0$], $k_i$=f(i) for row 1 of Table 7.4.1.5.2-1=>$\rho$=3(4 bit)

[$b_5$ . . . $b_0$], $k_i$=f(i) for row X of Table 7.4.1.5.2-1=>$\rho$=2(6 bit)

[$b_2$ . . . $b_0$], $k_i$=f(i) for row X of Table 7.4.1.5.2-1=>$\rho$=4(3 bit)

Of the frequency domain indication, the following two parts ([$b_5$ . . . $b_0$], [$b_2$ . . . $b_0$]) mean an example newly added based on the CSI-RS location. The positioning reference signal may include N CSI-RS resources having such a flexible CSI-RS allocation characteristic, defining the intended positioning reference signal pattern.

In an example for such purpose, upon configuring a positioning reference signal in slot, the starting positions of N single symbol CSI-RS resources may be set to be the same.

Figure 22:
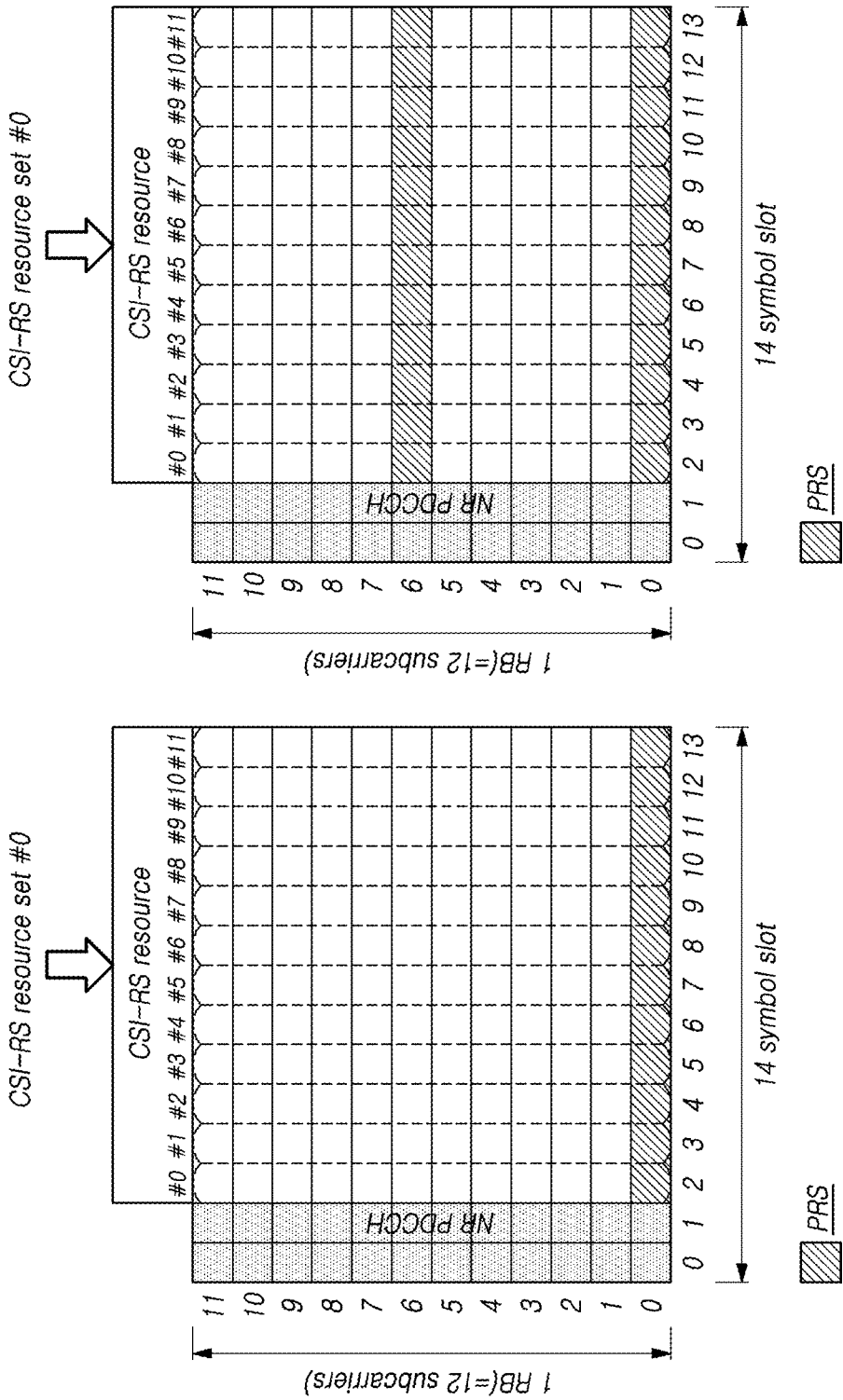
FIGS. 22 and 23 are views illustrating an example (fixed pattern) of a positioning reference signal configuration using a multiple channel state information reference signal (CSI-RS) resource according to an embodiment.
Figure 23:
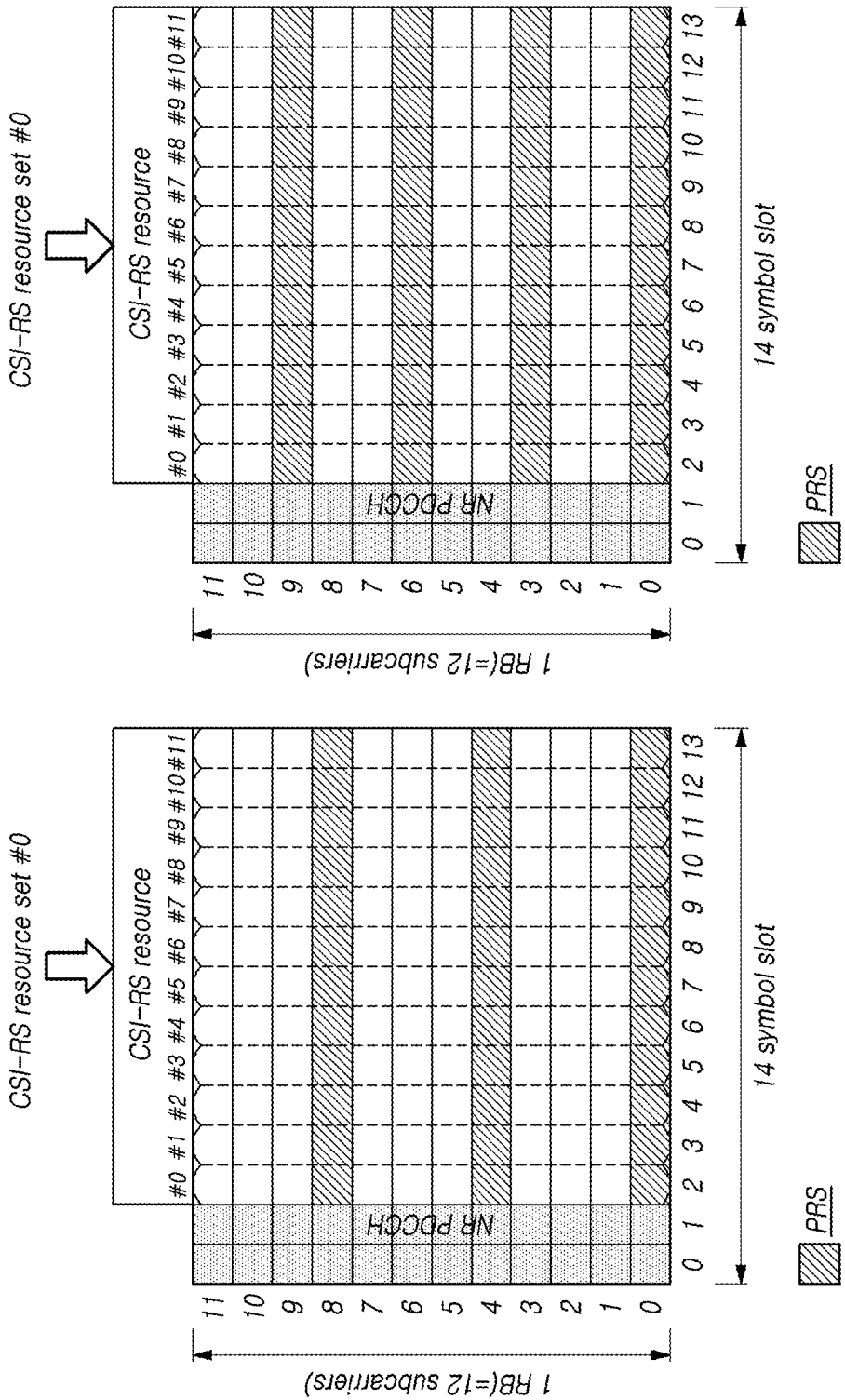

In this case, it is assumed that one CSI-RS resource set is defined in the NR slot, with a total 12 CSI-RS resources configured therein. In the following, in the cases where $\rho$=1, 2, 3, and 4 for the allocation position of CSI-RS RE in slot, the positioning reference signal (PRS) pattern may be configured based on the function-domain higher layer parameter CSI-RS-ResourceMapping configuration information. According to this, the same RE mapping applies for all the CSI-RS resources in the slot as shown in FIGS. 22 and 23. In this case, FIG. 22 illustrates the cases (Case 1 and Case 2) where $\rho$=1 and 2, and FIG. 23 illustrates the cases (Case 3 and Case 4) where $\rho$=3 and 4.

Case 1: $\rho$=1 (12 bit)=>[$b_{11}$ . . . $b_0$], $k_i$=f(i) (refer to Table 11, row 2)

Starting SC location of CSI-RS resource #0, #1, . . . , #11=[000000000001]=>$b_0$ 2. Case 2: $\rho=2$ (6 bit)=>[$b_5$ ... $b_0$], $k_i$=f(i) (refer to Table 11, row x)

Starting SC location of CSI-RS resource #0, #1, ..., #11=[000001000001]=>(b6, b0)

3. Case 3: $\rho=3$ (4 bit)=>[$b_3$ ... $b_0$], $k_i$=f(i) (refer to Table 11, row 1)

Starting SC location of CSI-RS resource #0, #1, ..., #11=[000100010001]=>(b8, b4, b0)

4. Case 4: $\rho=4$ (3 bit)=>[$b_2$ ... $b_0$], $k_i$=f(i) (refer to Table 11, row x)

Starting SC location of CSI-RS resource #0, #1, ..., #11=[001001001001] (b9, b6, b3, b0)

In another embodiment, upon configuring the positioning reference signal in slot, the starting positions of N single symbol CSI-RS resources may be same in part or be set to differ from each other.

Figure 24:
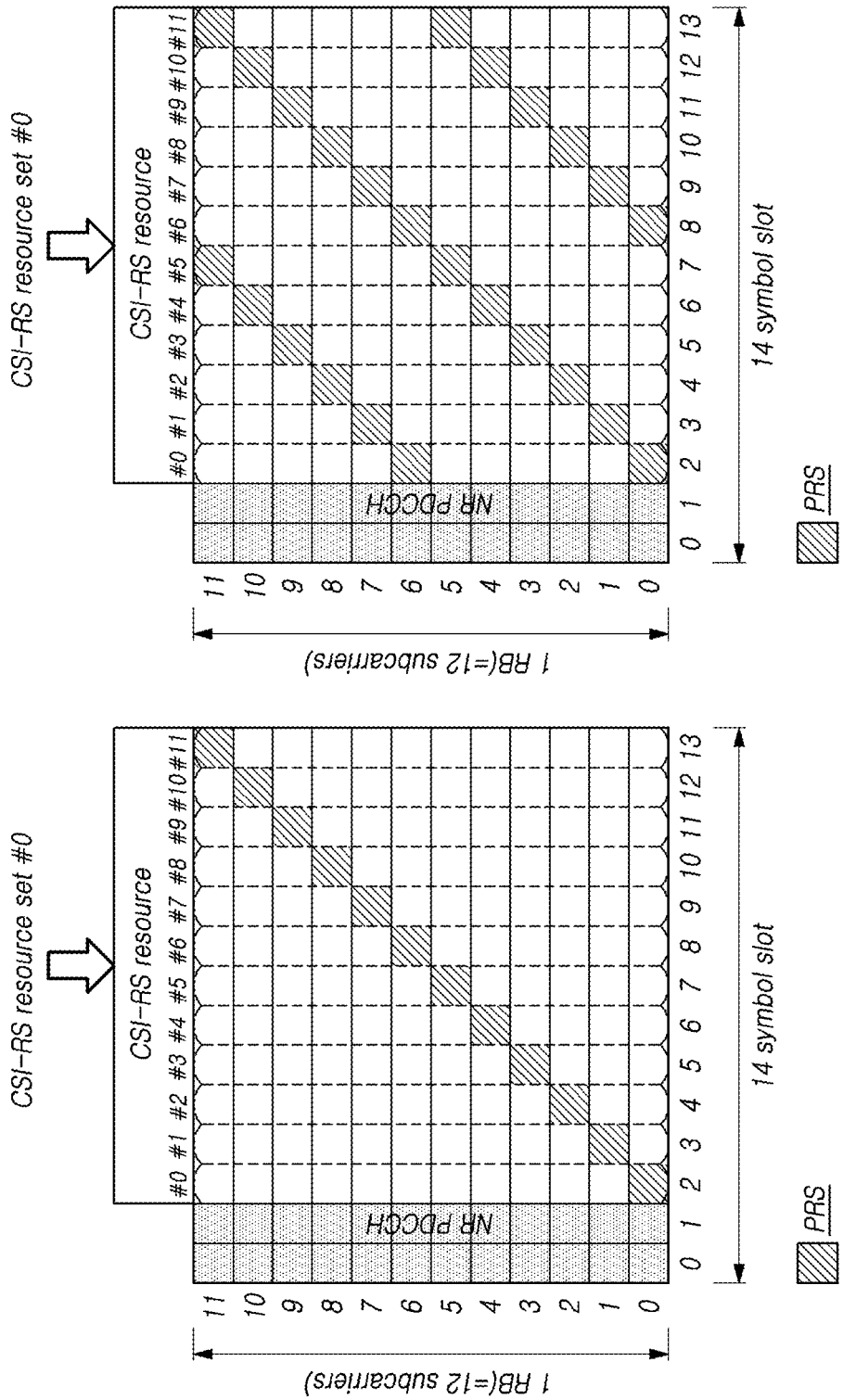
FIGS. 24 and 25 are views illustrating an example (ramping/increase pattern) of a positioning reference signal configuration using a multiple channel state information reference signal (CSI-RS) resource according to an embodiment.
Figure 25:
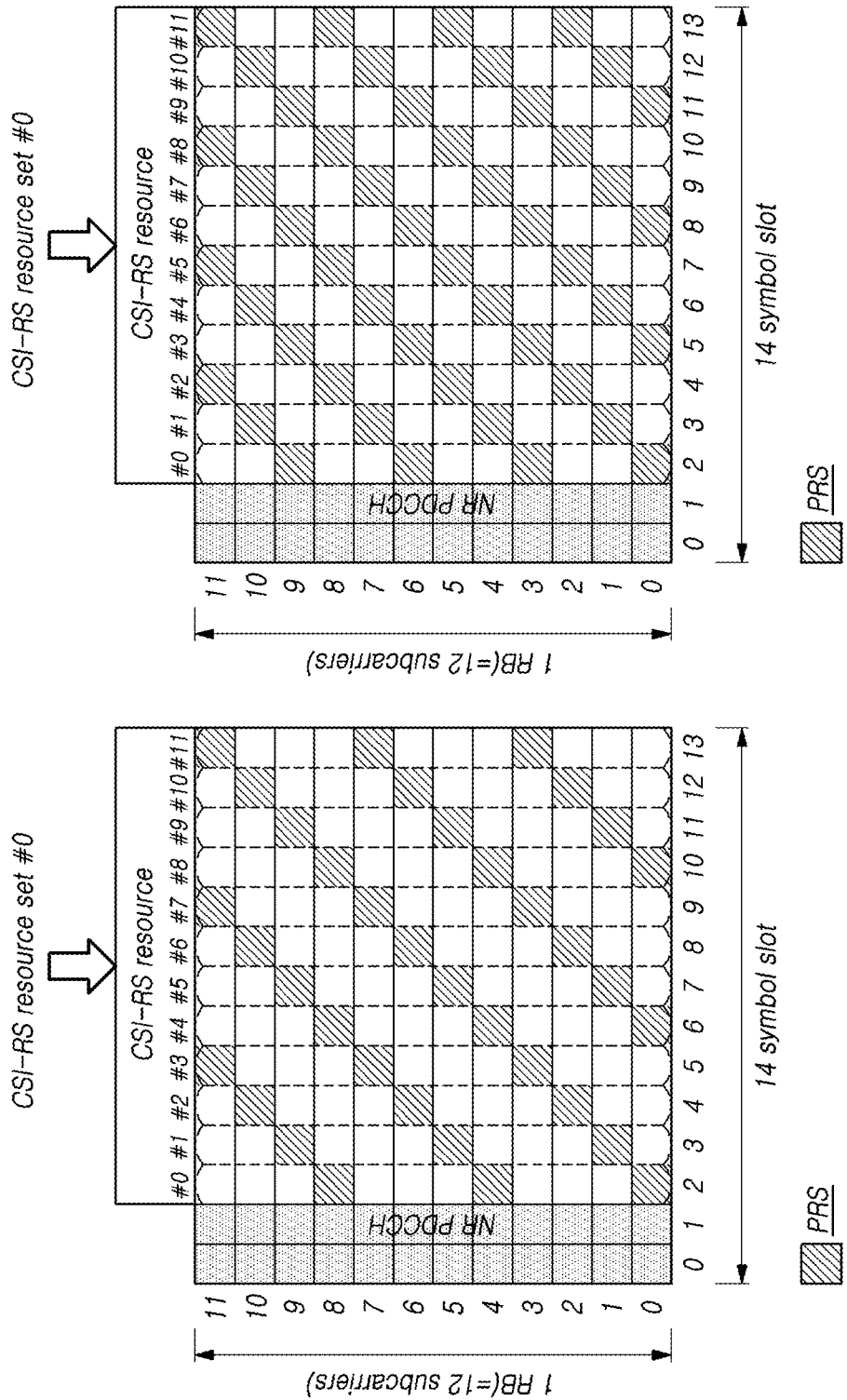

In this case, it is assumed that one CSI-RS resource set is defined in the NR slot, with a total 12 CSI-RS resources configured therein. In the following, in the cases where $\rho=1$, 2, 3, and 4 for the allocation position of CSI-RS RE in slot, the positioning reference signal (PRS) pattern may be configured based on the function-domain higher layer parameter CSI-RS-ResourceMapping configuration information. According to this, all the CSI-RS resources in the slot may be rendered to differ (ramping case) as shown in FIGS. 24 and 25. In this case, FIG. 24 illustrates the cases (Case 1 and Case 2) where $\rho=1$ and 2, and FIG. 25 illustrates the cases (Case 3 and Case 4) where $\rho=3$ and 4.

Case 1: $\rho=1$ (12 bit)=>[$b_{11}$ ... $b_0$], $k_i$=f(i) (refer to Table 11, row 2)

Starting SC location of CSI-RS resource #0= [000000000001]=>b0

Starting SC location of CSI-RS resource #1= [000000000010]=>b1

Starting SC location of CSI-RS resource #2= [000000000100]=>b2

...

Starting SC location of CSI-RS resource #11= [100000000000] b11

2. Case 2: $\rho=2$ (6 bit)=>[$b_5$ ... $b_0$], $k_i$=f(i) (refer to Table 11, row x)

Starting SC location of CSI-RS resource #0= [000000000001]=>(b6,b0)

Starting SC location of CSI-RS resource #1= [000000000010]=>(b7,b1)

Starting SC location of CSI-RS resource #2= [000000000100]=>(b8,b2)

Starting SC location of CSI-RS resource #3= [001000001000]=>(b9,b3)

Starting SC location of CSI-RS resource #4= [010000010000]=>(b10,b4)

Starting SC location of CSI-RS resource #5= [100000100000]=>(b11,b5)

Starting SC location of CSI-RS resource #6= [000001000001]=>(b6,b0)

...

Starting SC location of CSI-RS resource #11= [100000100000]=>(b6, b0)

3. Case 3: $\rho=3$ (4 bit)=>[$b_3$ ... $b_0$], $k_i$=f(i) (refer to Table 11, row 1)

Starting SC location of CSI-RS resource #0= [000100010001]=>(b8,b4,b0)

Starting SC location of CSI-RS resource #1= [001000100010]=>(b9,b5,b1)

Starting SC location of CSI-RS resource #2= [010001000100]=>(b10,b6,b2)

Starting SC location of CSI-RS resource #3= [100010001000]=>(b11,b7,b3)

Starting SC location of CSI-RS resource #4= [000100010001]=>(b8,b4,b0)

...

Starting SC location of CSI-RS resource #11= [100010001000]=>(b11,b7,b3)

4. Case 4: $\rho=4$ (3 bit)=>[$b_2$ ... $b_0$], $k_i$=f(i) (refer to Table 11, row x)

Starting SC location of CSI-RS resource #0= [001001001001]=>(b9,b6,b3,b0)

Starting SC location of CSI-RS resource #1= [010010010010]=>(b10,b7,b4,b1)

Starting SC location of CSI-RS resource #2= [100100100100]=>(b11,b8,b5,b2)

Starting SC location of CSI-RS resource #3= [001001001001]=>(b9,b6,b3,b0)

...

Starting SC location of CSI-RS resource #11= [100100100100]=>(b11,b8,b5,b2)

Accordingly, it is possible to design a positioning reference signal pattern to meet high requirements in various use cases for 5G NR.

The above-described transmission pattern mapping method in the radio resource of positioning reference signal may apply to other embodiments described below, in substantially the same manner unless contradictory in technical spirit.

Accordingly, there may be provided a specific method for flexibly configuring a radio resource used in transmission of a positioning reference signal per cell, in performing positioning in a next-generation wireless network. Inter-cell interference of positioning reference signal (PRS) may be efficiently controlled via a positioning reference signal (PRS) mapping method considering the BWP newly adopted in NR.

In a second embodiment, the base station (gNB) may configure multiple BWPs for transmission of the positioning reference signal (PRS). In this embodiment, a UE which is capable of activating the multiple BWPs is hypothesized, and what has been described above in connection with the first embodiment may apply, as it is, unless contradictory in technical spirit.

The Rel-15 NR UE may activate only one BWP. That is, the base station (gNB) may perform scheduling on all the BWPs (up to four), but the UE performs transmission/reception via only one BWP. However, for UEs which support multi-BWP activation, transmission of the positioning reference signal (PRS) may be performed via multiple BWPs. At this time, the UE performing only single BWP activation according to the UE's capability may perform the legacy operation, and the UE supporting multiple BWP activation may perform positioning reference signal (PRS) detection via multiple BWP activation.

Figure 26:
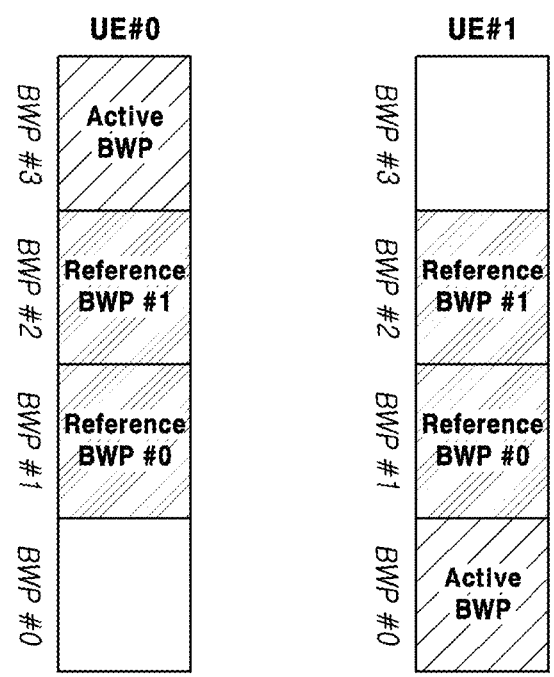
FIG. 26 is a view illustrating a configuration of a multi-bandwidth part used to transmit a positioning reference signal according to an embodiment.

That is, multiple BWPs may be configured as positioning reference signal (PRS) transmission BWPs as shown in FIG. 26. For example, UE #0 and UE #1 are assumed to be UEs having UE capability supporting multiple BWP activation. UE #0 and UE #1 perform PDSCH reception on BWP #3 and BWP #0, respectively, not PRS-BWPs. Thereafter, if transmission of the positioning reference signal (PRS) is performed, the positioning reference signal (PRS) may be received via BWP #1/#2 which is the reference BWP #0/#1 set as the positioning reference signal (PRS) transmission bandwidth.

In this case, for example, information about the list of bandwidth parts where the positioning reference signal is transmitted may be added to the existing positioning reference signal (PRS) higher layer configuration information as shown in FIG. 27. That is, the prs-BWPList information may be added to the positioning reference signal configuration information. For example, if among all the BWPs, BWP #0 and BWP #1 are used, the PRS-BWPList which has the values of is configured. Here, the term "Prs-BWPList" is merely an example but, without limitations thereto, other terms may be used if the information field indicating multiple BWPs where the positioning reference signal (PRS) is transmitted is indicated.

Further, the multiple BWPs for transmission of the positioning reference signal (PRS) may be selected and configured as consecutive, or non-consecutive BWPs.

For example, since the bandwidths for the multiple BWPs may differ from each other, the 'prs-Bandwidth' field in the legacy positioning reference signal (PRS) higher layer signaling may be utilized. In this case, two approaches may be applied.

Use of single Prs-Bandwidth field: The positioning reference signal (PRS) bandwidths of all the BWPs may be set to be identical regardless of the size of BWP bandwidths. Resultantly, the positioning reference signal (PRS) transmission bandwidth may be determined considering the smallest BWP bandwidth size.

Use of multiple Prs-Bandwidth field: A positioning reference signal (PRS) bandwidth may be configured per BWP. Thus, a different positioning reference signal (PRS) bandwidth may be set per BWP.

Embodiment of Prs-Bandwidth field configuration

Prs-Bandwidth=$N_1$ PRBs=>$1^{st}$ BWP for PRS transmission

Prs-Bandwidth2=$N_2$ PRBs=>$2^{nd}$ BWP for PRS transmission

. . .

Hereinafter, a method of applying the positioning reference signal (PRS) configured for multiple BWPs according to the second embodiment to the multiple cells will be described below.

According to an embodiment, the positioning reference signal (PRS) with the multiple BWPs configured therein may be transmitted in the same manner in all the cells. In this case, all the cells follow the same positioning reference signal (PRS) BWP configuration. That is, where a single or multiple reference BWPs for transmission of the positioning reference signal (PRS) are configured, all the cells may transmit the positioning reference signal (PRS) using the same BWPs. Thus, higher layer signaling information for configuring the positioning reference signal (PRS) may be used in all the cells in the same manner.

For example, the following configuration may be possible.

Cell #0: BWP #0
Cell #1: BWP #0
Cell #2: BWP #0
. . .

For multiple BWP activation UEs, the following configuration is possible as well. At this time, repeated transmission of the positioning reference signal (PRS) between the multiple positioning reference signals (PRSs) is also possible, and a new signal may be generated for mapping.

Cell #0: BWP #0, BWP #1
Cell #1: BWP #0, BWP #1
Cell #2: BWP #0, BWP #1
. . .

As another example, the positioning reference signal (PRS) with multiple BWPs configured therein may be transmitted in different BWPs per cell group (gNB group). In such a case, each cell may be configured to use a different BWP per specific group.

That is, per cell group, a different BWP may be used to transmit the positioning reference signal (PRS) and, by such method, inter-positioning reference signal (PRS) interference control may be carried out more efficiently. For example, where density on frequency axis of positioning reference signal (PRS) allocation pattern (density per PRB/symbol) is brought high, frequency reuse factor (FRF) decreases so that more interference may occur between the neighboring cells. However, since positioning reference signal (PRS) density is high, per-cell OTDOA measurement accuracy may increase. At this time, more efficient interference control is possible using a per-cell group BWP splitting method. That is, since practical FRF increases, the detection accuracy of positioning reference signal (PRS) may rise.

For example, where transmission of the positioning reference signal (PRS) is configured via a different BWP per cell group, grouping as shown in Table 12 below may be possible.

TABLE 12

| Cell Group #0 (BWP #0) | Cell Group #1 (BWP #2) |
| --- | --- |
| Cell #0 | Cell #1 |
| Cell #2 | Cell #3 |
| Cell #4 | Cell #5 |
| . . . | . . . |

According to this, there may be provided a method for flexibly configuring a radio resource used in transmission of a positioning reference signal per cell, in performing positioning in a next-generation wireless network. Inter-cell interference of PRS may be efficiently controlled via the positioning reference signal (PRS) mapping method considering multiple BWPs.

Structural configurations of a UE and a base station which may perform all or some of the embodiments described above in connection with FIGS. 1 to 27 are described below with reference to the drawings.

Figure 35:
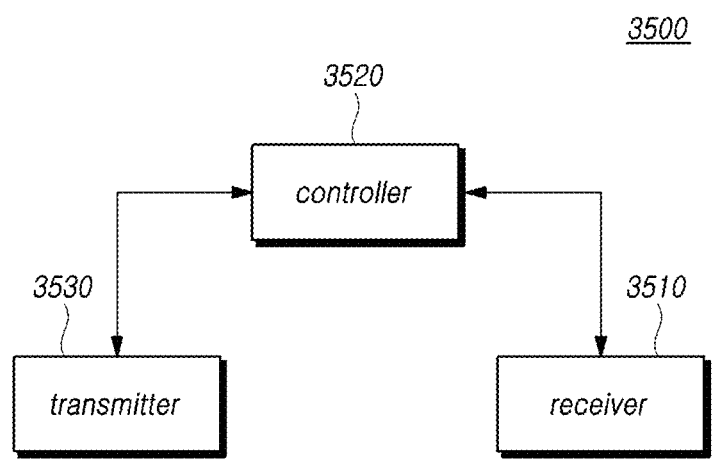
FIG. 35 is a block diagram illustrating a user equipment according to at least one embodiment of the present disclosure.

FIG. 35 is a block diagram illustrating a UE 3500 according to an embodiment.

Referring to FIG. 35, according to the first and second embodiments, the UE 3500 includes a receiver 3510, a controller 3520, and a transmitter 3530.

The controller 3520 may identify configuration information for a transmission bandwidth of a positioning reference signal configured per cell.

The configuration information for the transmission bandwidth of the positioning reference signal may be received by the receiver 3510 via higher layer signaling. That is, a positioning reference signal transmission bandwidth suitable for the UE's circumstance may be selected by the base station, and configuration information about the selected transmission bandwidth may be received by the UE via higher layer signaling.

The controller 3520 may identify a specific BWP configured to transmit the positioning reference signal among the BWPs configured in the system carrier from the configuration information for the transmission bandwidth of the positioning reference signal. In this case, the controller 3520 may identify the BWP index information indicating the BWP where the positioning reference signal (PRS) is transmitted.

For example, multiple BWPs may be configured for transmission of the positioning reference signal (PRS). For UEs which support multi-BWP activation, transmission of the positioning reference signal (PRS) may be performed via multiple BWPs. That is, multiple BWPs may be configured as positioning reference signal (PRS) transmission BWPs.

In this case, the controller 3520 may identify information about the list of bandwidth parts where the positioning reference signal is transmitted, included in the positioning reference signal (PRS) higher layer configuration information. For example, the multiple BWPs for transmission of the positioning reference signal (PRS) may be selected and configured as consecutive, or non-consecutive BWPs.

For example, the positioning reference signal (PRS) with the multiple BWPs configured therein may be transmitted in the same manner in all the cells. In this case, all the cells follow the same positioning reference signal (PRS) BWP configuration. That is, where a single or multiple specific BWPs for transmission of the positioning reference signal (PRS) are configured, all the cells may transmit the positioning reference signal (PRS) using the same BWPs. Thus, higher layer signaling information for configuring the positioning reference signal (PRS) may be used in all the cells in the same manner.

As another example, the positioning reference signal (PRS) with multiple BWPs configured therein may be transmitted in different BWPs per cell group (gNB group). In such a case, each cell may be configured to use a different BWP per specific group.

That is, per cell group, a different BWP may be used to transmit the positioning reference signal (PRS). By so doing, inter-positioning reference signal (PRS) interference control may be carried out more efficiently.

For example, upon transmission of a positioning reference signal, the base station may configure one or more specific BWPs and may flexibly configure a time-frequency mapping of per-cell positioning reference signals. In this case, it is assumed that the above-described BWP for transmission of the positioning reference signal (PRS) has been determined between neighboring cells or between multiple cells. At this time, in the BWP for transmission of the positioning reference signal (PRS) per cell, mapping for the positioning reference signal (PRS) pattern may be performed in the time-frequency domain. That is, the positioning reference signal may be mapped based on at least one of frequency domain allocation information or time domain allocation information in at least one bandwidth part.

In the case of the positioning reference signal (PRS)'s own mapping, the positioning reference signal (PRS) itself may be newly added to a physical signal in the same manner as typically. That is, upon time-frequency mapping of the positioning reference signal (PRS), a frequency domain shift pattern may be implicitly defined based on cell ID information. According to such a mapping of the cell ID-based positioning reference signal (PRS) pattern, the UE may be precisely aware of the positioning reference signal (PRS) patterns of the neighboring cells, so that detection of per-cell positioning reference signal (PRS) is possible, and per-cell interference control may be facilitated.

In the case of channel state information reference signal (CSI-RS) resource mapping, the positioning reference signal (PRS) exists only in the higher layer signaling configuration, and the actual positioning reference signal (PRS) is transmitted as a physical signal via the CSI-RS resource. For the UE to be aware of the positioning reference signal (PRS) patterns of all the cells, a default CSI-RS mapping pattern may be defined, and per-cell shift patterns may be performed by adding separate signaling.

The receiver 3510 may receive the positioning reference signal corresponding to each cell based on the configuration information for the transmission bandwidth. The receiver 3510 may receive the positioning reference signal according to the configuration information for the transmission bandwidth received from the base station. For example, it is assumed that each UE performs PDSCH reception via any activated BWP. In this case, the receiver 3510 may activate a specific BWP configured to transmit the positioning reference signal for UE positioning and may receive the positioning reference signal.

For example, where multiple specific BWPs are configured, the receiver 3510 may activate the multiple specific BWPs configured to transmit the positioning reference signal for UE positioning and receive the positioning reference signal. In this case, the positioning reference signal configured in the multiple BWPs may be transmitted using the same BWP in all the cells. Or, the positioning reference signal configured in the multiple BWPs may be transmitted in a different BWP per cell group (gNB group).

In this case, in a specific bandwidth, the receiver 3510 may receive the positioning reference signal in the radio resource allocated to transmission of the positioning reference signal based on the configuration information for the positioning reference signal transmission pattern. For example, for positioning the UE, the receiver 3510 may receive a positioning reference signal from each of the serving cell and at least two or more neighboring cells. The controller 3520 may measure reference signal time difference information between the received reference signals.

The transmitter 3530 may transmit RSTD information for the positioning reference signals to the base station. The base station may estimate the crossing area based on the RSTD information. Thus, the UE's position may be estimated.

According to the embodiments, it is possible to flexibly configure a radio resource used in transmission of a positioning reference signal per cell, in performing positioning in a next-generation wireless network. Further, it is possible to efficiently control Inter-cell interference of positioning reference signal (PRS) via a positioning reference signal (PRS) mapping method considering the BWP.

Figure 36:
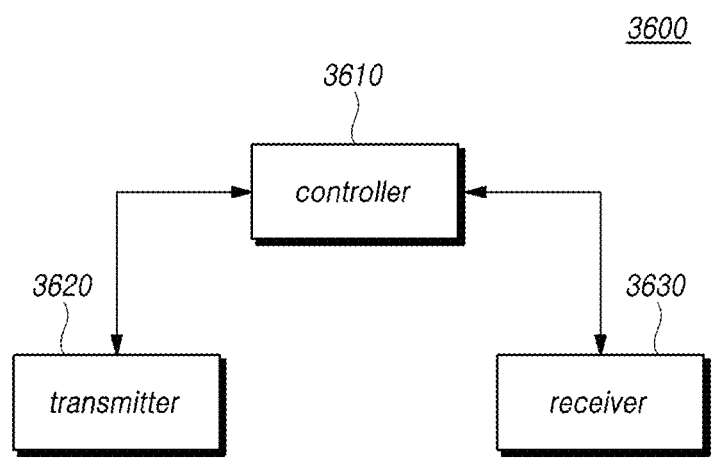
FIG. 36 is a block diagram illustrating a base station according to at least one embodiment of the present disclosure.

FIG. 36 is a block diagram a base station 3600 according to an embodiment.

Referring to FIG. 36, according to an embodiment, a base station 3600 includes a controller 3610, a transmitter 3620, and a receiver 3630.

The controller 3610 controls the overall operation of the base station 3600 according to a method of performing positioning necessary for performing the embodiments as described above. The controller 3610 may configure configuration information for a transmission bandwidth of a positioning reference signal per cell.

The configuration information for the transmission bandwidth of the positioning reference signal may be transmitted by the transmitter 3620 via higher layer signaling. That is, the controller 3610 may select a positioning reference signal transmission bandwidth suitable for the UE's circumstance and transmit configuration information about the selected transmission bandwidth to the UE via higher layer signaling.

The UE may identify a specific BWP configured to transmit the positioning reference signal among the BWPs configured in the system carrier from the configuration information for the transmission bandwidth of the positioning reference signal. In this case, the transmitter 3620 may transmit the BWP index information indicating the BWP where the positioning reference signal (PRS) is transmitted, to the UE via higher layer signaling.

For example, multiple BWPs may be configured for transmission of the positioning reference signal (PRS). For UEs which support multi-BWP activation, transmission of the positioning reference signal (PRS) may be performed via multiple BWPs. That is, multiple BWPs may be configured as positioning reference signal (PRS) transmission BWPs.

In this case, the controller 3610 may add information about the list of bandwidth parts where the positioning reference signal is transmitted, to the positioning reference signal (PRS) higher layer configuration information. For example, the multiple BWPs for transmission of the positioning reference signal (PRS) may be selected and configured as consecutive, or non-consecutive BWPs.

For example, the positioning reference signal (PRS) with the multiple BWPs configured therein may be transmitted in the same manner in all the cells. In this case, all the cells follow the same positioning reference signal (PRS) BWP configuration. That is, where a single or multiple specific BWPs for transmission of the positioning reference signal (PRS) are configured, all the cells may transmit the positioning reference signal (PRS) using the same BWPs. Thus, higher layer signaling information for configuring the positioning reference signal (PRS) may be used in all the cells in the same manner.

As another example, the positioning reference signal (PRS) with multiple BWPs configured therein may be transmitted in different BWPs per cell group (gNB group). In such a case, each cell may be configured to use a different BWP per specific group.

That is, per cell group, a different BWP may be used to transmit the positioning reference signal (PRS). By so doing, inter-positioning reference signal (PRS) interference control may be carried out more efficiently.

For example, upon transmission of a positioning reference signal, the controller 3610 may configure one or more specific BWPs and may flexibly configure a time-frequency mapping of per-cell positioning reference signals. In this case, it is assumed that the above-described BWP for transmission of the positioning reference signal (PRS) has been determined between neighboring cells or between multiple cells. At this time, in the BWP for transmission of the positioning reference signal (PRS) per cell, mapping for the positioning reference signal (PRS) pattern may be performed in the time-frequency domain. That is, the positioning reference signal may be mapped based on at least one of frequency domain allocation information or time domain allocation information in at least one bandwidth part.

In the case of the positioning reference signal (PRS)'s own mapping, the positioning reference signal (PRS) itself may be newly added to a physical signal in the same manner as conventional. That is, upon time-frequency mapping of the positioning reference signal (PRS), a frequency domain shift pattern may be implicitly defined based on cell ID information. According to such a mapping of the cell ID-based positioning reference signal (PRS) pattern, the UE may be precisely aware of the positioning reference signal (PRS) patterns of the neighboring cells, so that detection of per-cell positioning reference signal (PRS) is possible, and per-cell interference control may be facilitated.

In the case of channel state information reference signal (CSI-RS) resource mapping, the positioning reference signal (PRS) exists only in the higher layer signaling configuration, and the actual positioning reference signal (PRS) is transmitted as a physical signal via the CSI-RS resource. For the UE to be aware of the positioning reference signal (PRS) patterns of all the cells, a default CSI-RS mapping pattern may be defined, and per-cell shift patterns may be performed by adding separate signaling.

The transmitter 3620 may transmit the positioning reference signal corresponding to each cell based on the configuration information for the transmission bandwidth. The transmitter 3620 may transmit the positioning reference signal to the UE according to the configuration information for the transmission bandwidth. For example, it is assumed that each UE performs PDSCH reception via any activated BWP. In this case, the transmitter 3620 may instruct to activate a specific BWP configured to transmit the positioning reference signal for UE positioning and may transmit the positioning reference signal.

For example, where multiple specific BWPs are configured, the transmitter 3620 may instruct to activate the multiple specific BWPs configured to transmit the positioning reference signal for UE positioning and transmit the positioning reference signal. In this case, the positioning reference signal configured in the multiple BWPs may be transmitted using the same BWP in all the cells. Or, the positioning reference signal configured in the multiple BWPs may be transmitted in a different BWP per cell group (gNB group).

For example, for positioning the UE, the UE may receive a positioning reference signal from each of the serving cell and at least two or more neighboring cells. The UE may measure reference signal time difference information between the received reference signals.

The receiver 3630 may receive the RSTD information for the positioning reference signal from the UE. The controller 3610 may estimate the crossing area based on the RSTD information. Thus, the UE's position may be estimated.

According to this, there may be provided a specific method for flexibly configuring a radio resource used in transmission of a positioning reference signal per cell, in performing positioning in a next-generation wireless network. Inter-cell interference of positioning reference signal (PRS) may be efficiently controlled via a positioning reference signal (PRS) mapping method considering the BWP.

The configuration of the bandwidth where the positioning reference signal is transmitted has been described above. Hereinafter, a method of reporting reference signal time difference (RSTD) information for a positioning reference signal based on UE capability will be described.

Figure 28:
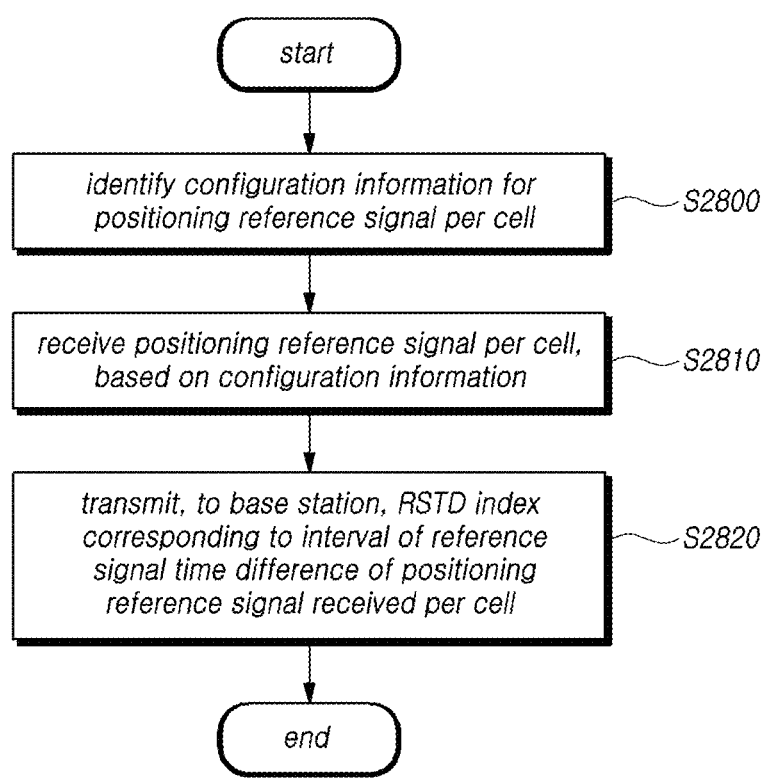
FIG. 28 is a flowchart illustrating a procedure of a UE for performing positioning according to an embodiment.

FIG. 28 is a flowchart illustrating a procedure of a UE for performing positioning according to an embodiment. In the instant embodiment, what has been described above may be applied unless contradictory in technical spirit.

Referring to FIG. 28, a UE may identify configuration information for a positioning reference signal (PRS) configured per cell (S2800).

The UE may receive configuration information for the positioning reference signal configured for the cell where the UE belongs. The transmission bandwidth of the positioning reference signal suitable for the UE's circumstance, transmission pattern of positioning reference signal, or such configuration information may be configured per cell by the base station. The UE may receive the configuration information via higher layer signaling.

Referring back to FIG. 28, the UE may receive the positioning reference signal (PRS) per cell, based on the configuration information (S2810).

The UE may receive the positioning reference signal in the radio resource allocated for transmission of the positioning reference signal based on the received configuration information. The UE may receive the positioning reference signal mapped based on the cell ID of each cell in the specific BWP configured to transmit the positioning reference signal.

Referring back to FIG. 28, the UE may transmit the RSTD index corresponding to the interval of the reference signal time difference (RSTD) of the positioning reference signal received per cell based on preconfigured table information, to the base station (S2820).

The preconfigured table used to report the RSTD index may be configured per UE or per cell in the reference signal time difference intervals of a plurality of positioning reference signals individually mapped to the plurality of RSTD indexes as shown in Table 7.

For example, in the preconfigured table, the interval of the interval of the reference signal time difference may be configured based on the positioning reference signal reporting mode indicated via higher layer signaling. In this case, a different reporting mode may be configured per resolution level.

According to this, upon positioning reference signal (PRS) higher layer signaling configuration, the reporting mode may be indicated directly by the information field. By so doing, the UE's positioning reference signal (PRS) reporting mode may be individually configured directly for each UE.

That is, if the UE's positioning reference signal (PRS) reporting mode is determined, the reporting resolution corresponding thereto may be defined in association therewith. For example, as the reporting table, the existing reporting table described above in connection with FIG. 7 may be utilized as it is. However, the unit of value meant according to the given reporting resolution may be varied and applied.

For example, the preconfigured table may be configured differently depending on the positioning reference signal reporting mode indicated via higher layer signaling based on the UE's capability. In this case, it is assumed that each UE's reporting resolution is given considering the UE's capability. At this time, the method of indicating each UE's reporting resolution may also be performed via reporting mode configuration as described above.

For example, per-resolution reporting tables may be defined to differ from each other. That is, if the UE's reporting resolution level is determined, the UE may perform reporting using the reporting table corresponding to the reporting resolution given to the UE. The base station may estimate the UE's location based on the received RSTD index.

According to the embodiments described above, it is possible to flexibly configure transmission of reference signal time difference (RSTD) information per UE or per cell, in performing positioning in a next-generation wireless network. It is also possible to efficiently control inter-cell interference of PRS via the reporting method considering the UE's capability.

Figure 29:
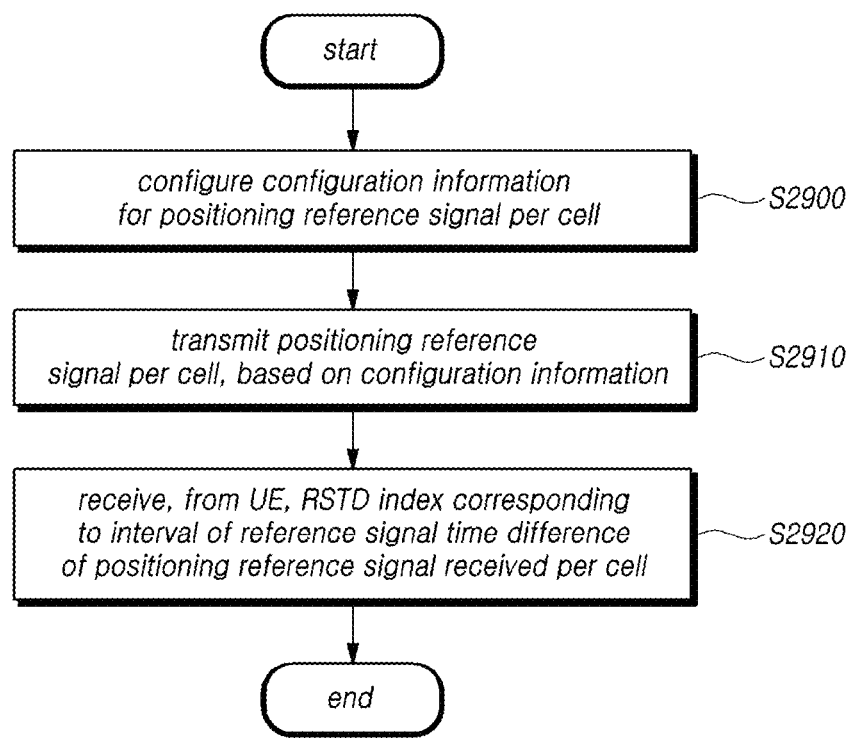
FIG. 29 is a flowchart illustrating a procedure of a base station for performing positioning according to an embodiment.

FIG. 29 is a flowchart illustrating a procedure of a base station performs positioning according to an embodiment.

Referring to FIG. 29, a base station may configure configuration information for a positioning reference signal (PRS) configured per cell (S2900).

The base station may transmit configuration information for the positioning reference signal configured for the cell where the UE belongs. The transmission bandwidth of the positioning reference signal suitable for the UE's circumstance, transmission pattern of positioning reference signal, or such configuration information may be configured per cell by the base station. The base station may transmit the configuration information to the UE via higher layer signaling.

Referring back to FIG. 29, the base station may transmit the positioning reference signal (PRS) per cell, based on the configuration information (S2910).

The base station may transmit, to the UE, the positioning reference signal in the radio resource allocated for transmission of the positioning reference signal based on the received configuration information. The base station may transmit, to the UE, the positioning reference signal mapped based on the cell ID of each cell in the specific BWP configured to transmit the positioning reference signal.

Referring back to FIG. 29, the base station may receive the RSTD index corresponding to the interval of the reference signal time difference (RSTD) of the positioning reference signal received per cell based on preconfigured table information, from the UE (S2920).

The preconfigured table used to report the RSTD index may be configured per UE or per cell in the reference signal time difference intervals of a plurality of positioning reference signals individually mapped to the plurality of RSTD indexes as shown in Table 7.

For example, in the preconfigured table, the interval of the interval of the reference signal time difference may be configured based on the positioning reference signal reporting mode indicated via higher layer signaling. In this case, a different reporting mode may be configured per resolution level.

According to this, upon positioning reference signal (PRS) higher layer signaling configuration, the reporting mode may be indicated directly by the information field. By so doing, the UE's positioning reference signal (PRS) reporting mode may be individually configured directly for each UE.

That is, if the UE's positioning reference signal (PRS) reporting mode is determined, the reporting resolution corresponding thereto may be defined in association therewith. For example, as the reporting table, the existing reporting table described above in connection with FIG. 7 may be utilized as it is. However, the unit of value meant according to the given reporting resolution may be varied and applied.

For example, the preconfigured table may be configured differently depending on the positioning reference signal reporting mode indicated via higher layer signaling based on the UE's capability. In this case, it is assumed that each UE's reporting resolution is given considering the UE's capability. At this time, the method of indicating each UE's reporting resolution may also be performed via reporting mode configuration as described above.

For example, per-resolution reporting tables may be defined to differ from each other. That is, if the UE's reporting resolution level is determined, the base station may receive, from the UE, reporting using the reporting table corresponding to the reporting resolution given to the UE. The base station may estimate the UE's location based on the received RSTD index.

According to the embodiments above, it is possible to flexibly configure transmission of reference signal time difference (RSTD) information per UE or per cell, in performing positioning in a next-generation wireless network. It is also possible to efficiently control inter-cell interference of PRS via the reporting method considering the UE's capability.

Hereinafter, a specific embodiment of reporting RSTD information measured for a positioning reference signal to the base station considering the UE's capability will be described.

In a third embodiment, the reporting resolution for the positioning reference signal (PRS) may be set to differ based on the UE's capability. In the instant embodiment, what has been described above in connection with the first and second embodiments may be applied unless contradictory in technical spirit.

In the instant embodiment, there is proposed a reporting procedure with various location positioning resolutions considering various positioning reference signal (PRS) requirements considered in NR. For example, consideration may be centered on the UE's capability. In the case of following the OTDOA scheme, the UE is required to derive a reference signal reception time difference with each base station and report this value to the base station. In this case, various reporting modes may be adopted considering the UE's capability or the resolution required per use scenario. Where the values are differentiated for each unit of time sample basically used, the reporting resolutions may be divided in time sample units of step sizes. Hereinafter, relevant embodiments will be described in detail.

According to an embodiment, a different reporting mode may be configured per resolution level.

According to the embodiment, upon positioning reference signal (PRS) higher layer signaling configuration, the reporting mode may be indicated directly by the information field. For example, as shown in FIG. 30, a prs-ReportingMode field indicating the positioning reference signal (PRS) reporting mode may be added to the configuration information (PRS-Info) of positioning reference signal. However, "prs-ReportingMode" is an example and, without limitations thereto, other terms may be used. By so doing, the UE's positioning reference signal (PRS) reporting mode may be individually configured directly for each UE.

In this case, it is assumed that the UE's capability has previously been reported to the base station (gNB). For example, where the reporting mode is defined as $N_{mode}$, the reporting resolution for each mode may be defined as follows. Here, Mode 0 indicates the lowest resolution, and downwards, the reporting resolution may increase. Thus, in the scenario requiring low costs, the mode may be set to be close to Mode 0 and, in the scenario requiring high performance, the mode may be set to be close to Mode $N_{mode}-1$.

Mode 0: 10 Ts
Mode 1: 5 Ts
Mode 2: 1 Ts
Mode 3: 0.5 Ts
Mode 4: 0.2 Ts
. . .
Mode $N_{mode}-1$: 'X' Ts That is, if the UE's positioning reference signal (PRS) reporting mode is determined, the reporting resolution corresponding thereto may be defined in association therewith. For example, as the reporting table, the existing reporting table described above in connection with FIG. 7 may be utilized as it is. However, the unit of value meant according to the given reporting resolution may be varied and applied.

According to another embodiment, a different reporting table may be defined and used per resolution level.

In this case, it is assumed that each UE's reporting resolution is given considering the UE's capability. At this time, the method of indicating each UE's reporting resolution may also be performed via reporting mode configuration as described above. For example, per-resolution reporting tables may be defined to differ from each other.

That is, if the UE's reporting resolution level is determined, the UE may perform reporting using the reporting table corresponding to the reporting resolution given to the UE. For example, the following configuration may be made.

Resolution level 0: 10 Ts=>Table A
Resolution level 1: 5 Ts=>Table B
Resolution level 2: 1 Ts=>Table C
. . .
Resolution level $N_{level}-1$: 'X' Ts=>Table X According to this, there may be provided a specific method for flexibly configuring a radio resource used in transmission of a positioning reference signal per cell, in performing positioning in a next-generation wireless network. Inter-cell interference of positioning reference signal (PRS) may be efficiently controlled via a positioning reference signal (PRS) mapping method considering the BWP.

Structural configurations of a UE and a base station which may perform all or some of the embodiments described above in connection with FIGS. 28 to 30 are described below with reference to the drawings.

The UE 3500 shown in FIG. 35 may perform operations according to the third embodiment.

Referring to FIG. 35, according to an embodiment, the UE 3500 includes a receiver 3510, a controller 3520, and a transmitter 3530.

The controller 3520 may identify configuration information for a positioning reference signal (PRS) configured per cell. The receiver 3510 may receive configuration information for the positioning reference signal configured for the cell where the UE belongs. The transmission bandwidth of the positioning reference signal suitable for the UE's circumstance, transmission pattern of positioning reference signal, or such configuration information may be configured per cell by the base station. The receiver 3510 may receive the configuration information via higher layer signaling.

The receiver 3510 may receive the positioning reference signal (PRS) per cell, based on the configuration information. The receiver 3510 may receive the positioning reference signal in the radio resource allocated for transmission of the positioning reference signal based on the received configuration information. The receiver 3510 may receive the positioning reference signal mapped based on the cell ID of each cell in the specific BWP configured to transmit the positioning reference signal.

The transmitter 3530 may transmit the RSTD index corresponding to the interval of the reference signal time difference (RSTD) of the positioning reference signal received per cell based on preconfigured table information, to the base station. The preconfigured table used to report the RSTD index may be configured per UE or per cell in the reference signal time difference intervals of a plurality of positioning reference signals individually mapped to the plurality of RSTD indexes.

For example, in the preconfigured table, the interval of the interval of the reference signal time difference may be configured based on the positioning reference signal reporting mode indicated via higher layer signaling. In this case, a different reporting mode may be configured per resolution level.

According to the embodiment above, upon positioning reference signal (PRS) higher layer signaling configuration, the reporting mode may be indicated directly by the information field. By so doing, the UE's positioning reference signal (PRS) reporting mode may be individually configured directly for each UE.

That is, if the UE's positioning reference signal (PRS) reporting mode is determined, the reporting resolution corresponding thereto may be defined in association therewith. For example, as the reporting table, the existing reporting table described above in connection with FIG. 7 may be utilized as it is. However, the unit of value meant according to the given reporting resolution may be varied and applied.

For example, the preconfigured table may be configured differently depending on the positioning reference signal reporting mode indicated via higher layer signaling based on the UE's capability. In this case, it is assumed that each UE's reporting resolution is given considering the UE's capability. At this time, the method of indicating each UE's reporting resolution may also be performed via reporting mode configuration as described above.

For example, per-resolution reporting tables may be defined to differ from each other. That is, if the UE's reporting resolution level is determined, the transmitter 3530 may perform reporting using the reporting table corresponding to the reporting resolution given to the UE.

According to the embodiment above, it is possible to flexibly configure transmission of reference signal time difference (RSTD) information per UE or per cell, in performing positioning in a next-generation wireless network. It is also possible to efficiently control inter-cell interference of PRS via the reporting method considering the UE's capability.

The base station 3600 shown in FIG. 36 may perform operations according to the third embodiment.

Referring to FIG. 36, according to an embodiment, a base station 3600 includes a controller 3610, a transmitter 3620, and a receiver 3630.

The controller 3610 may configure configuration information for a positioning reference signal (PRS) configured per cell. The transmitter 3620 may transmit configuration information for the positioning reference signal configured for the cell where the UE belongs. The transmission bandwidth of the positioning reference signal suitable for the UE's circumstance, transmission pattern of positioning reference signal, or such configuration information may be configured per cell by the controller 3610. The transmitter 3620 may transmit the configuration information to the UE via higher layer signaling.

The transmitter 3620 may transmit the positioning reference signal (PRS) per cell, based on the configuration information.

The transmitter 3620 may transmit, to the UE, the positioning reference signal in the radio resource allocated for transmission of the positioning reference signal based on the received configuration information. The transmitter 3620 may transmit, to the UE, the positioning reference signal mapped based on the cell ID of each cell in the specific BWP configured to transmit the positioning reference signal.

The receiver 3630 may receive the RSTD index corresponding to the interval of the reference signal time difference (RSTD) of the positioning reference signal received per cell based on preconfigured table information, from the UE.

The preconfigured table used to report the RSTD index may be configured per UE or per cell in the reference signal time difference intervals of a plurality of positioning reference signals individually mapped to the plurality of RSTD indexes as shown in Table 7.

For example, in the preconfigured table, the interval of the interval of the reference signal time difference may be configured based on the positioning reference signal reporting mode indicated via higher layer signaling. In this case, a different reporting mode may be configured per resolution level.

According to the embodiment described, upon positioning reference signal (PRS) higher layer signaling configuration, the reporting mode may be indicated directly by the information field. By so doing, the UE's positioning reference signal (PRS) reporting mode may be individually configured directly for each UE.

That is, if the UE's positioning reference signal (PRS) reporting mode is determined, the reporting resolution corresponding thereto may be defined in association therewith. For example, as the reporting table, the existing reporting table described above in connection with FIG. 7 may be utilized as it is. However, the unit of value meant according to the given reporting resolution may be varied and applied.

For example, the preconfigured table may be configured differently depending on the positioning reference signal reporting mode indicated via higher layer signaling based on the UE's capability. In this case, it is assumed that each UE's reporting resolution is given considering the UE's capability. At this time, the method of indicating each UE's reporting resolution may also be performed via reporting mode configuration as described above.

For example, per-resolution reporting tables may be defined to differ from each other. That is, if the UE's reporting resolution level is determined, the receiver 3630 may receive, from the UE, reporting using the reporting table corresponding to the reporting resolution given to the UE. The controller 3610 may estimate the UE's location based on the received RSTD index.

According to the embodiment above, it is possible to flexibly configure transmission of reference signal time difference (RSTD) information per UE or per cell, in performing positioning in a next-generation wireless network. It is also possible to efficiently control inter-cell interference of PRS via the reporting method considering the UE's capability.

Meanwhile, in connection with performing positioning, if the base station expands coverage using a relay, it is needed to address an error due to transmission of the positioning reference signal via the relay. This will be described below with reference to the relevant drawings. The relay described below means a node which is used to expand the coverage of a base station, such as a relay node or repeater.

In a fourth embodiment, filtering may be performed on the positioning reference signal (PRS) transmission BWP band in the relay node.

As described above, for OTDOA-based UE positioning, the time difference between each base station (gNB) and the UE needs to be estimated. Where the base station uses a relay to expand coverage, the measurement for the time difference between a specific base station and the UE may indicate a location different from the actual one. Or, where a delay occurs inside in signal processing while passing through the relay, a closer cell may be estimated as being positioned relatively far away.

Figure 31:
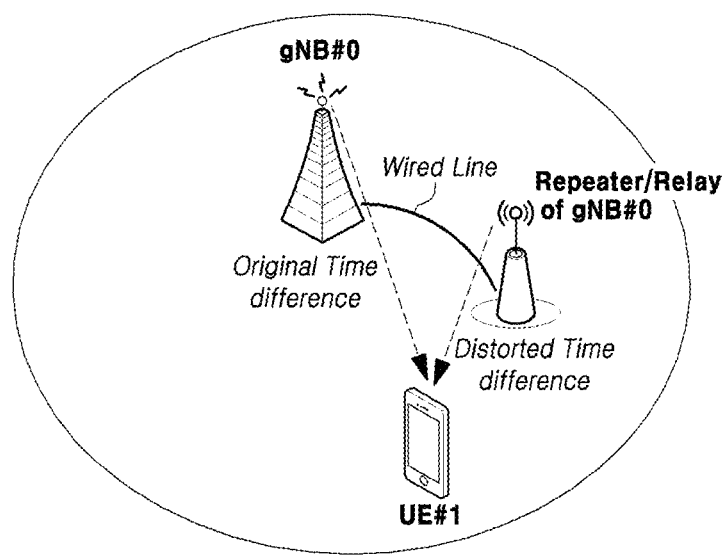
FIG. 31 is a view illustrating an example in which a reference signal time difference of a positioning reference signal is varied depending on use of a relay node according to an embodiment.

That is, as shown in FIG. 31, UE UE #1 is required to actually measure the time difference between UE #1 and base station gNB #0, but a time difference may be measured due to the relay node which is the relay located close. Since the relay node transmits the same positioning reference signal (PRS) as that of the base station, the UE may measure the time difference with the relay node, wrong as the time difference with the base station, based on the positioning reference signal (PRS) measured with relatively the largest signal. In such a case, the UE may not differentiate such differences.

Thus, according to the instant embodiment, the relay node may filter the corresponding BWP bandwidth based on information about the positioning reference signal (PRS) transmission BWP band. That is, if the relay node performs filtering on the BWP where the positioning reference signal (PRS) is transmitted, the positioning reference signal (PRS) transmitted in the filtered BWP may be muted. Thus, correct time difference may be measured between the target base station (gNB) and the UE. Basically, data transmission, such as of PDSCH, does not occur when the positioning reference signal (PRS) is transmitted. Thus, no particular loss arises.

Figure 32:
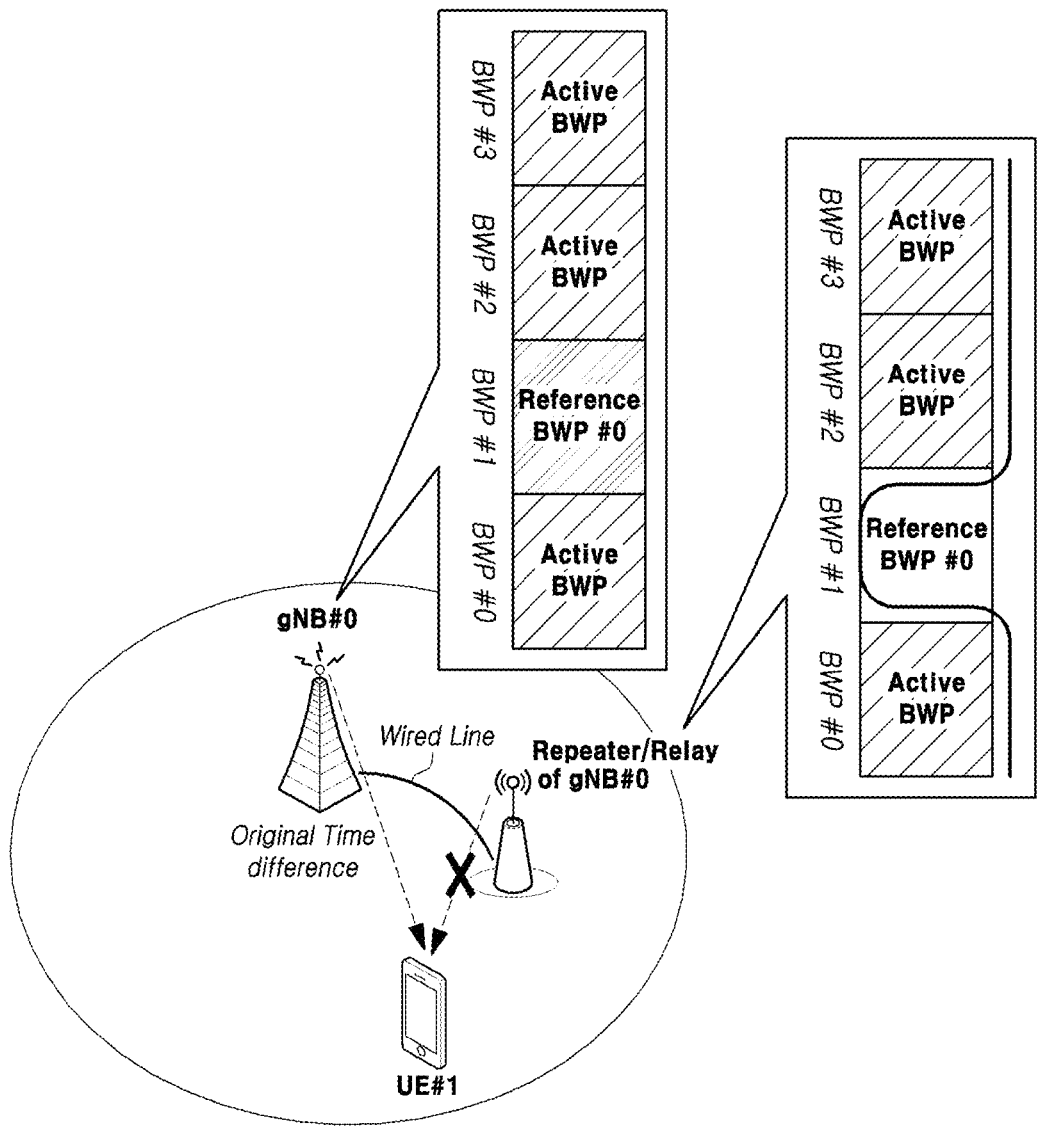
FIG. 32 is a view illustrating an example of filtering a bandwidth part where a positioning reference signal is transmitted depending on use of a relay node according to an embodiment.

For example, it is hypothesized as shown in FIG. 32 that the base station gNB #0 performs scheduling on a total of four BWPs. The base station separates the UEs for the BWPs and performs scheduling. The positioning reference signal (PRS) is transmitted via a specific BWP. At this time, the same signal is transmitted via the relay node through the wired line. In this case, if the BWP where the positioning reference signal (PRS) is transmitted in the relay node is removed by filtering, there may be no more transmission of the positioning reference signal (PRS) in the relay. In other words, filtering is performed in the relay node, thereby removing the error in time difference due to the relay node. FIG. 32 illustrates an example in which BWP #1 is filtered by a relay so that no signal is transmitted to a UE UE #1 through the corresponding bandwidth.

For example, where a positioning reference signal (PRS) is transmitted in the BWP, a predetermined guard interval may be further considered in relation to the prs-Bandwidth which indicates the transmission bandwidth of the positioning reference signal (PRS). The guard interval may mean an interval needed because perpendicular filtering is substantially impossible when filtering is carried out. Generally, a 10% physical RB (PRB) may be allocated as a guard band. As necessary, upon configuring a positioning reference signal (PRS) band, the size may be assigned considering the guard band, or information about the guard band may be included in the PRS-info higher layer signaling information. For example, as shown in FIG. 33, an information field indicating the guard band may be added to the positioning reference signal (PRS) configuration information. In such a case, for example, the prs-GuardBandwidth may be individually configured corresponding to a given prs-Bandwidth or may be configured as a percentage.

Figure 34:
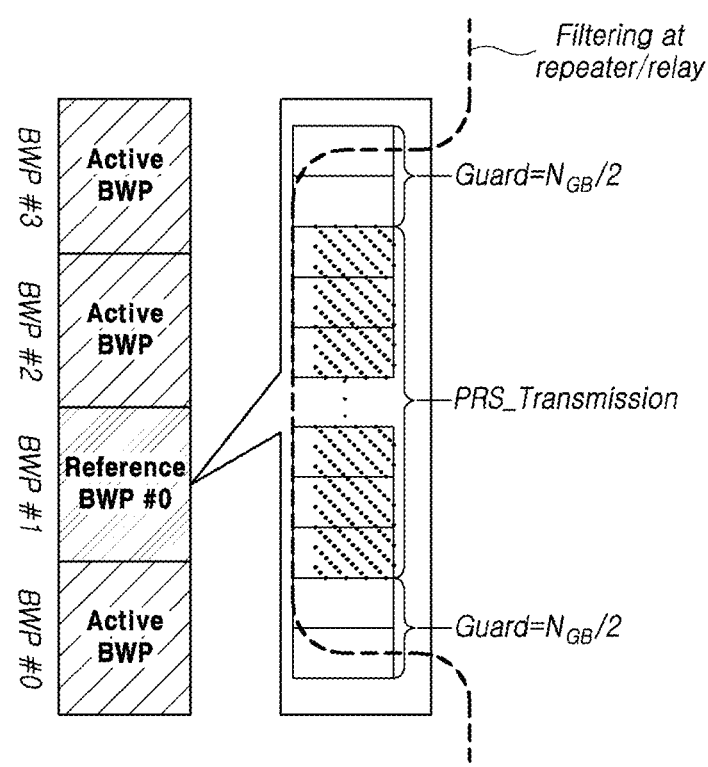
FIG. 34 is a view illustrating an example of mapping a positioning reference signal considering a filter guard bandwidth of a relay node according to an embodiment.

Specifically, as shown in FIG. 34, the positioning reference signal (PRS) is not transmitted in the full bandwidth but may be transmitted, mapped not to include the guard band. That is, the relay node may necessarily need a mapping of the positioning reference signal (PRS) which makes it possible to stably remove only the signal of the BWP for transmitting the positioning reference signal (PRS).

According to an embodiment, the base station (gNB) may directly filter the corresponding BWP of the relay node.

For the above-described relay node filtering of positioning reference signal (PRS) transmission BWP, the relay node needs to be aware of information about the BWP for transmitting the positioning reference signal (PRS). Thus, the base station may directly control the filtering of the relay node, using the prs-BWPIndex or prs-BWPList information. That is, since the relay operation itself is controlled by the base station, there is no need for information which is to be additionally transferred for the relay.

According to another embodiment, the base station may transfer positioning reference signal (PRS) transmission BWP information to the relay node, and the relay node may filter the corresponding BWP.

In this case, the base station transfers information about the BWP where the positioning reference signal (PRS) is transmitted, to the relay nodes connected with the base station. By so doing, the relay node may perform BWP filtering using information given according to the capability of the relay node. Thus, the information that the base station provides to the relays may include, e.g., prs-BWPList or prs-BWPIndex, which is the information about the BWP where the positioning reference signal (PRS) is transmitted, and guard band information.

According to this, even when transmission by relay is used, positioning using the positioning reference signal (PRS) may be performed without an error due to the relay.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface". "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for performing positioning by a user equipment (UE), the method comprising:
   identifying configuration information for a transmission bandwidth of a positioning reference signal (PRS) configured per cell;
   receiving configuration information for the positioning reference signal;
   receiving the positioning reference signal corresponding to each cell based on the configuration information for the transmission bandwidth and the configuration information for the positioning reference signal; and
   transmitting a reference signal time difference (RSTD) index corresponding to an interval of a RSTD of the positioning reference signal received per cell based on a reporting table, to a base station,
   wherein the reporting table is one corresponding to a reporting resolution given to the UE among per-resolution reporting tables which are defined to differ from each other, and
   wherein the configuration information for the positioning reference signal comprises frequency domain allocation information including a number of resource elements set to one OFDM symbol per resource block through which the positioning reference signal is transmitted within a slot and time domain allocation information including location of a start symbol of the positioning reference signal within the slot.

2. The method of claim 1, wherein
   the configuration information for the transmission bandwidth of the positioning reference signal is received via higher layer signaling.

3. The method of claim 1, wherein
   the positioning reference signal is received based on information about at least one bandwidth part (BWP) for each cell.

4. A method for performing positioning by a base station, the method comprising:
   configuring configuration information for a transmission bandwidth of a positioning reference signal (PRS) per cell;
   transmitting configuration information for the positioning reference signal;
   transmitting the positioning reference signal corresponding to each cell based on the configuration information for the transmission bandwidth and the configuration information for the positioning reference signal; and
   receiving a reference signal time difference (RSTD) index corresponding to an interval of a RSTD of the positioning reference signal received per cell based on a reporting table, from a user equipment (UE),
   wherein the reporting table is one corresponding to a reporting resolution given to the UE among per-resolution reporting tables which are defined to differ from each other, and
   wherein the configuration information for the positioning reference signal comprises frequency domain allocation information including a number of resource elements set to one OFDM symbol per resource block through which the positioning reference signal is transmitted within a slot and time domain allocation information including location of a start symbol of the positioning reference signal within the slot.

5. The method of claim 4, wherein
   the configuration information for the transmission bandwidth of the positioning reference signal is transmitted via higher layer signaling.

6. The method of claim 4, wherein
   the positioning reference signal is transmitted based on information about at least one bandwidth part (BWP) for each cell.

7. A UE performing positioning, the UE comprising:
   a controller identifying configuration information for a transmission bandwidth of a positioning reference signal (PRS) configured per cell;
   a receiver receiving (i) configuration information for the positioning reference signal and (ii) the positioning reference signal corresponding to each cell based on the configuration information for the transmission bandwidth and the configuration information for the positioning reference signal; and
   a transmitter configured to transmit a reference signal time difference (RSTD) index corresponding to an interval of a RSTD of the positioning reference signal received per cell based on a reporting table, to a base station,
   wherein the reporting table is one corresponding to a reporting resolution given to the UE among per-resolution reporting tables which are defined to differ from each other, and
   wherein the configuration information for the positioning reference signal comprises frequency domain allocation information including a number of resource elements set to one OFDM symbol per resource block through which the positioning reference signal is transmitted within a slot and time domain allocation information including location of a start symbol of the positioning reference signal within the slot.

8. The UE of claim 7, wherein
   the configuration information for the transmission bandwidth of the positioning reference signal is received via higher layer signaling.

9. The UE of claim 7, wherein
   the positioning reference signal is received based on information about at least one bandwidth part (BWP) where the positioning reference signal is transmitted for each cell.

* * * * *